(12) United States Patent
Grover et al.

(10) Patent No.: US 11,009,766 B2
(45) Date of Patent: May 18, 2021

(54) FOVEATED VIRTUAL REALITY NEAR EYE DISPLAYS

(71) Applicant: Intel Corporation, Santa Clara, CA (US)

(72) Inventors: Ginni Grover, Santa Clara, CA (US); Ronald Azuma, San Jose, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/456,250

(22) Filed: Jun. 28, 2019

(65) Prior Publication Data

US 2019/0384136 A1 Dec. 19, 2019

(51) Int. Cl.
| | | |
|---|---|---|
| *G02F 1/29* | (2006.01) | |
| *G02B 27/00* | (2006.01) | |
| *G06F 3/01* | (2006.01) | |
| *G09G 5/14* | (2006.01) | |
| *G09G 5/377* | (2006.01) | |
| *G09G 5/12* | (2006.01) | |

(52) U.S. Cl.
CPC ............ *G02F 1/29* (2013.01); *G02B 27/0081* (2013.01); *G06F 3/013* (2013.01); *G09G 5/12* (2013.01); *G09G 5/14* (2013.01); *G09G 5/377* (2013.01); *G02F 1/294* (2021.01); *G02F 2201/16* (2013.01); *G09G 2340/04* (2013.01); *G09G 2354/00* (2013.01)

(58) Field of Classification Search
CPC .................................. G02F 1/29; G06F 3/013
See application file for complete search history.

(56) References Cited

U.S. PATENT DOCUMENTS

| | | | | |
|---|---|---|---|---|
| 9,244,277 | B2 * | 1/2016 | Cheng | G02B 27/0172 |
| 10,064,545 | B2 * | 9/2018 | Hua | A61B 1/00172 |
| 10,451,947 | B1 * | 10/2019 | Lu | G06F 1/163 |
| 2018/0129167 | A1 * | 5/2018 | Maimone | G02B 27/0025 |
| 2018/0275410 | A1 * | 9/2018 | Yeoh | G02B 27/0172 |
| 2019/0285891 | A1 * | 9/2019 | Lam | G02F 1/133504 |
| 2019/0287495 | A1 * | 9/2019 | Mathur | G06F 3/011 |

OTHER PUBLICATIONS

Chang et al., "Towards Multifocal Displays with Dense Focal Stacks", Nov. 2018, ACM Trans. Graph, vol. 37, No. 6 (Year: 2018).*

* cited by examiner

*Primary Examiner* — Ryan R Yang
(74) *Attorney, Agent, or Firm* — Kacvinsky Daisak Bluni PLLC

(57) ABSTRACT

Disclosed herein is display stacks for virtual reality (VR) displays arranged to present an image where a focal point of the image is presented in higher resolution than a periphery around the focal point. The disclosure provides systems and methods for presenting an image comprising a high resolution having a smaller field of view than that with which a lower resolution image is presented around a periphery of the high resolution image.

22 Claims, 24 Drawing Sheets

Input Image
664

Input Image
764-1

Input Image
764-2

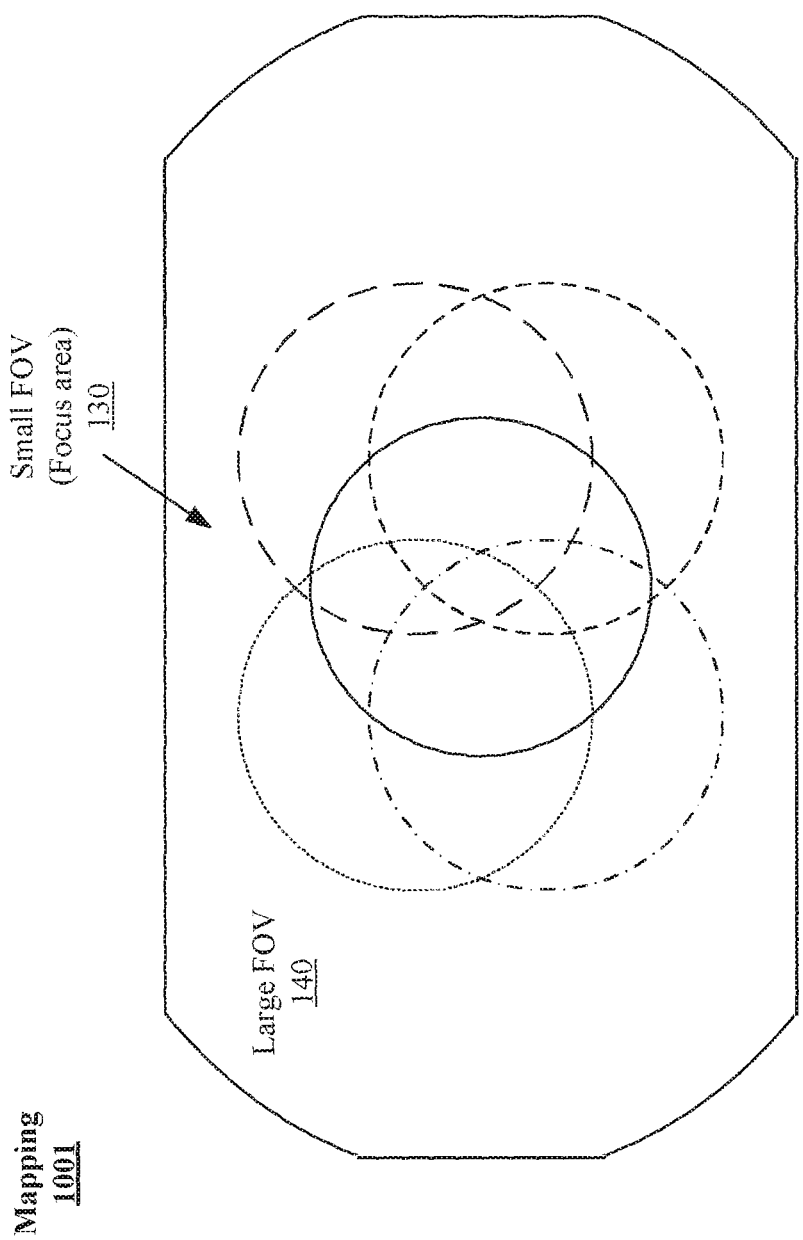

FOVEATED VIRTUAL REALITY NEAR EYE DISPLAYS

BACKGROUND

Some modern electronic devices incorporate or are operable with virtual reality (VR) displays. Many modern VR displays are meant to be worn or used near a viewer's eyes. Conventionally, VR displays do not provide resolution at the level with which a human eye can perceive. That is, current VR displays provide a resolution below the visual acuity of the human eye.

BRIEF DESCRIPTION OF THE DRAWINGS

FIG. 10 illustrates a small field of view state mapping.

DETAILED DESCRIPTION

Figure 1:
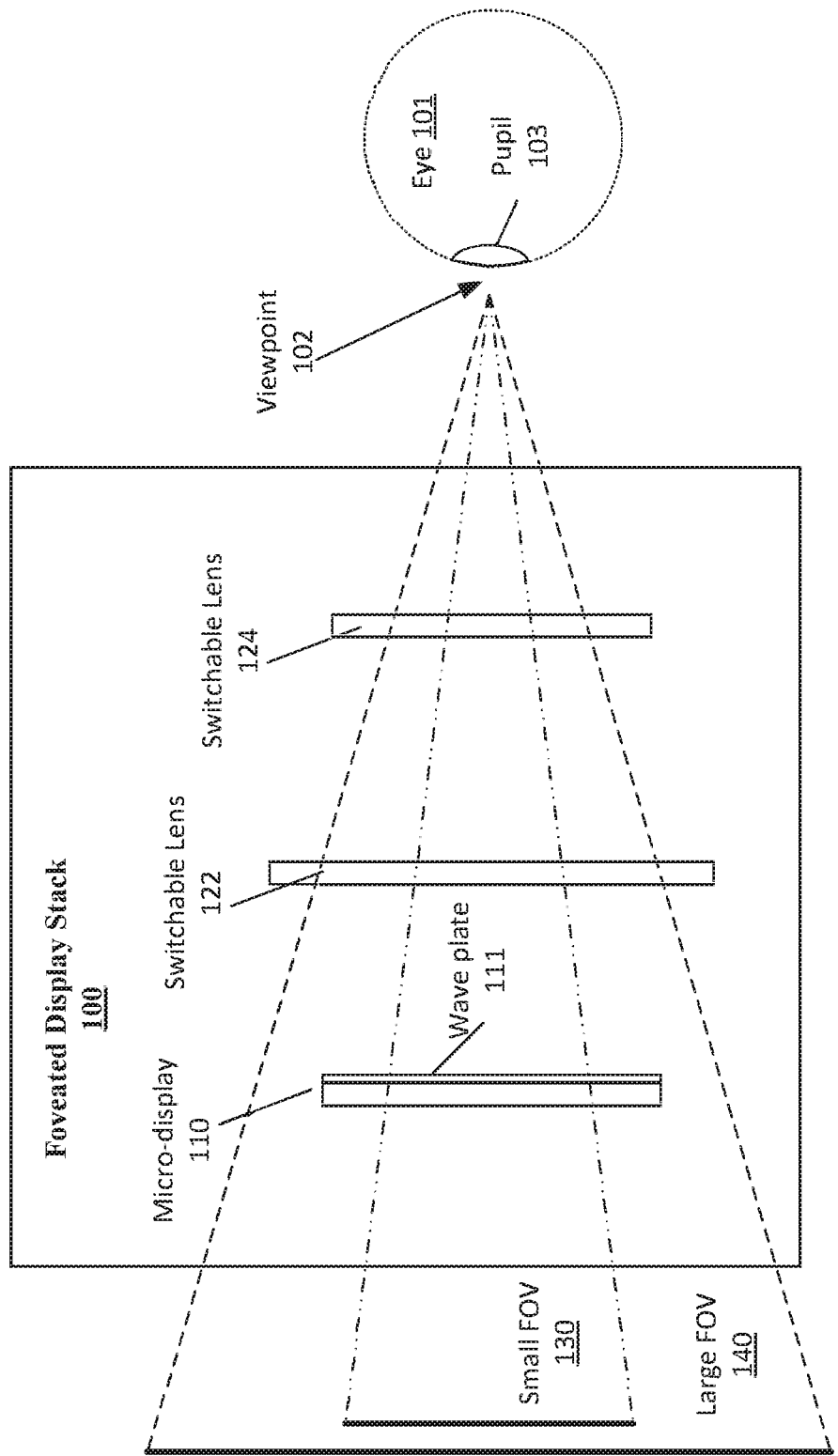
FIG. 1 illustrates a first foveated display stack.

The present disclosure provides display stacks for virtual reality (VR) displays arranged to present an image where a focus location (or viewpoint) of the image is presented in higher resolution than a periphery (or area) around the focus location. Furthermore, a system operable with the display and configured to present an image comprising a high resolution portion at a viewpoint and lower resolution portions around the periphery of the viewpoint is disclosed. Lastly, methods for presenting and generating such composite images are disclosed. Implementations based on the present disclosure can be used to generate such "foveated" images at resolutions proximate to that with which a human eye can perceive (e.g., 80-120 cycle per degree (cpd), or the like). It is important to note, the term foveated is related to the fovea of a human eye (e.g., the small field of view region at the center of the eye), which has the highest resolution or visual acuity of the eye. The fovea is used to see and perceive fine details in a scene by a viewer.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates an example of a display stack (or foveated display stack) 100. The display stack 100 includes a micro-display 110 and a pair of switchable lenses 122 and 124. In general, the display stack 100 is arranged to present a foveated image (e.g., refer to FIG. 3C) to viewpoint 102, where the foveated image can be perceived by a user (e.g., by eye 101).

For example, a state of one or more of the switchable lenses 122 and/or 124 may be iteratively modified (e.g., switched, or the like) to change characteristics of the one or more switchable lenses 122 and/or 124, such that the display stack 100 provides either a small field of view (FOV) 130 or a large field of view 140 virtual image. The micro-display 110 may iteratively present (e.g., display, or the like) an image for the low resolution FOV alternatively with an image for the high resolution FOV Likewise, a state of one or more of the switchable lenses 122 and/or 124 can be iteratively switched. Switching the state of the one or more switchable lenses 122 and/or 124 may be synchronized with presentation of the low resolution FOV and high resolution FOV images by micro-display 110. That is, presentation of an image for the large FOV 140 (e.g., the low resolution FOV image) by micro-display 110 can be synchronized with the states of switchable lenses 122 and/or 124 providing large FOV 140 while presentation of an image for the small FOV 130 (e.g., the high resolution FOV image) by micro-display 110 can be synchronized with the states of switchable lenses 122 and/or 124 providing small FOV 130.

It is noted, that the present disclosure uses the terms "high" and "low" and well as "small" and "large" throughout. This is merely done for convenience in referring to the FOV states and the displayed images. It is not intended to present an actual size of scale of the FOVs or images. Instead, the terms small and large and high and low are intended to imply a relative size between the virtual images themselves or the states. For example, the high resolution FOV image will have a resolution that is greater than the resolution of the low resolution FOV image when taken in combination and perceived at the viewpoint 102. That is, given the foveated image comprising both the high resolution FOV image and the low resolution FOV image around the periphery, the low resolution portion will have less pixel density (pixels per degree) than the high resolution portion when perceived at the viewpoint. However, images displayed on micro-display 110 may have the same resolution. Said differently, the high resolution FOV image and the low resolution FOV image may in reality have the same resolution (e.g., pixel density when displayed on micro-display 110, or the like); yet when perceived at viewpoint 102, or rendered to the large FOV 140 or small FOV 130, these images may be perceived to be of different resolutions. Likewise, the small FOV state will have a FOV that is smaller than the large FOV state. Thus, the terms high and low as well as small and large are used merely to distinguish between the perceived images and fields of view discussed herein and not to imply actual dimensions, size, pixel density, or focal lengths.

In practice, presentation of the low resolution FOV image and the high resolution FOV image can be synchronized with switching the state of one or more of the switchable lenses 122 and/or 124 at a high rate (e.g., greater than 120 Hz). Accordingly, the low resolution FOV image and the high resolution FOV image can be multiplexed at a high frame rate, such that they are perceived as a single image by the user, thus providing a foveated image display. As such, the high resolution FOV image may be presented central to viewpoint 102 (e.g., at the pupil 103 due to the small FOV 130) while the low resolution FOV image may be presented around the periphery of viewpoint 102 (e.g., around the periphery of pupil 103 due to the large FOV 140). As such, a foveated image can be perceived by a user (e.g., via eye 101). As example of this is given in greater detail below with respect to FIGS. 3A, 3B, and 3C.

Micro-display 110 can be any display suitable for incorporation or embedment into foveated display stack 100. With some examples, micro-display 110 can be a high pixel density relative to size display. As a specific example, micro-display 110 may be sized between 0.5 and 4 inches in one dimension by 0.5 and 8 inches in the other dimension. It is noted, that the micro-display may have any size, and particularly the size may vary depending upon the implementation. Additionally, micro-display 110 may have a pixel density of greater than 800 pixels per inch (PPI) (or greater than or equal to 800 PPI). With some examples, micro-display 110 may have a pixel density greater than 1800 PPI, or even greater than 2500 PPI. Micro-display 110 may be based on a number of different display technologies (e.g., light emitting diode (LED), organic LED (OLED), micro-LED, micro-elector-mechanical systems (MEMS), or the like). Micro-display 110 can be arranged to emit polarized light, for example, right circular polarized (RCP) light or left circular polarized (LCP) light. In some examples, micro-display 110 can emit linearly polarized light. In such examples, display stack 100 may optionally include a quarter-wave plate 111 to change the linearly polarized light emitted by micro-display 110 to either RCP or LCP polarization.

The switchable lenses 122 and 124 may be any of a variety of lenses that modulate transmitted light by manipulating the phase of the light. Manipulation of the phase of the light can be modified by the state of the switchable lenses 122 and 124. In some examples, switchable lens 122 and/or 124 can be geometric phase lens (GPL) or a diffractive waveplate lens (DWL). In general, GPL and DWL are switchable between two focal lengths (e.g., +f/−f, on/off state). In some examples, the switchable lenses 122 and 124 can be switched at a rate greater than 60 Hz (e.g., between 90 Hz and 120 Hz, or the like).

It is noted, in some examples, micro-display 110 can be arranged to output color images while switchable lenses 122 and 124 can be arranged to manipulate the phase of light of one color at a time (or a color spectrum). As such, in some examples, a pair of switchable lenses (e.g., 122 and 124) can be provided for each color. As a specific example, a display stack could be provided where the display stack includes 3 pairs of switchable lenses (e.g., a first pair for the red light, a second pair for the green light, and a third pair for the blue light). Examples are not limited in this context.

Figure 2A:
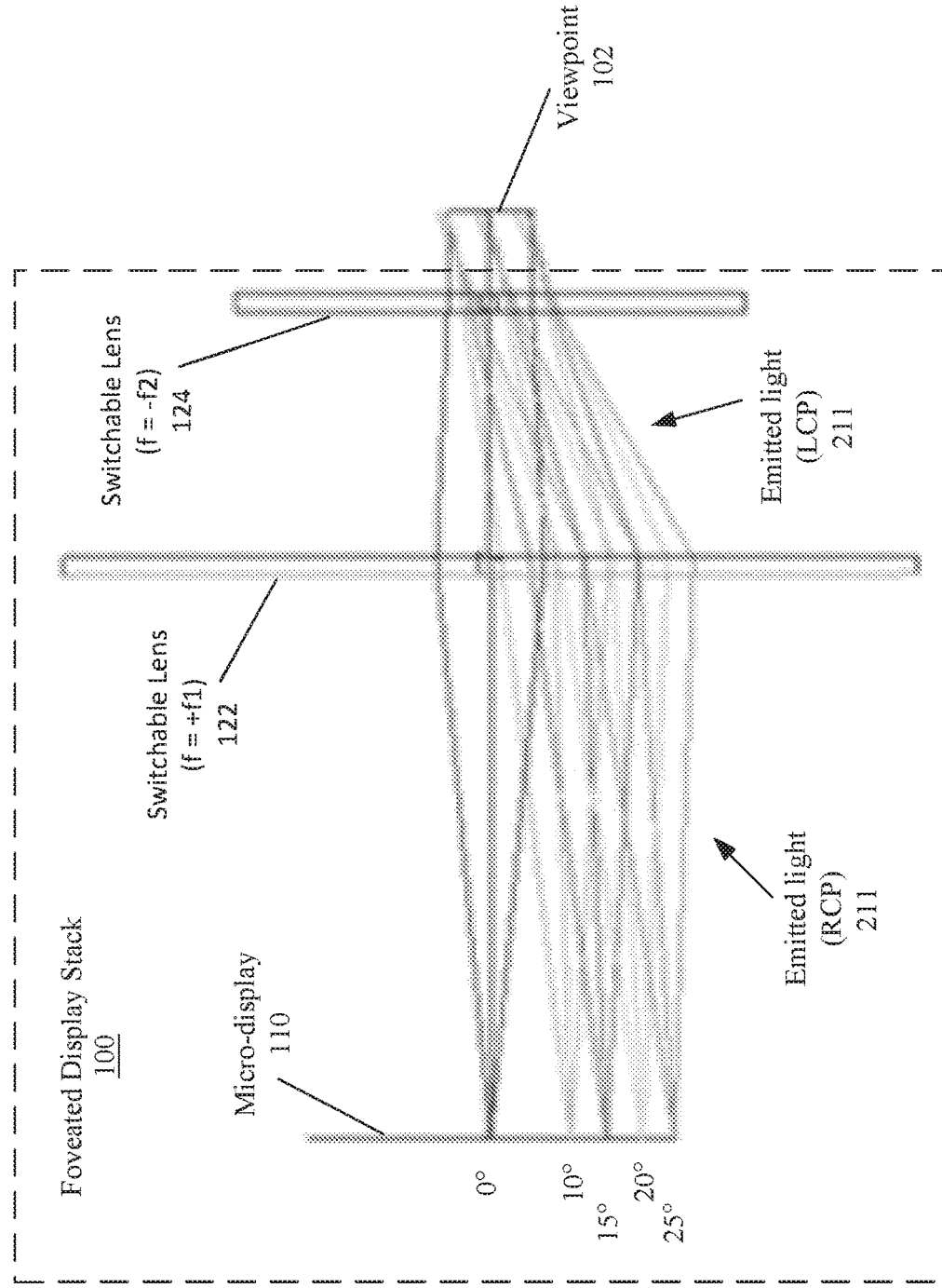
FIG. 2A illustrates the first foveated display stack of FIG. 1 in a large field of view state.
Figure 2B:
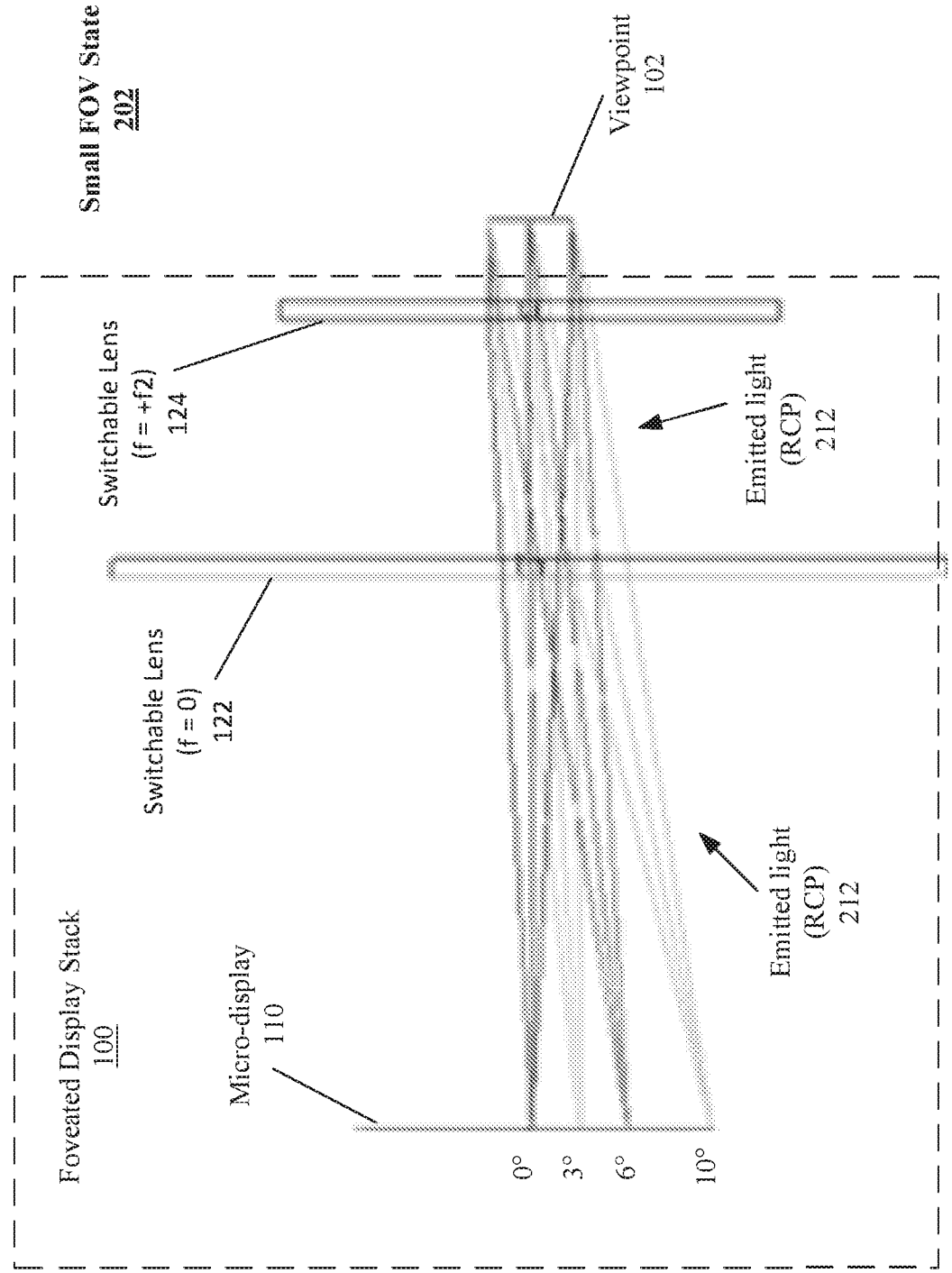
FIG. 2B illustrates the first foveated display stack of FIG. 1 in a small field of view state.

FIGS. 2A and 2B illustrate light rays for display stack 100 in two states. The first state 201, depicted in FIG. 2A, illustrates a large FOV state 201 of display stack 100 corresponding to a low resolution FOV virtual image; while the second state 202, depicted in FIG. 2B, illustrates a small FOV state 202 of display stack 100 corresponding to a high resolution FOV virtual image.

As shown in FIG. 2A, micro-display 110 of display stack 100 is emitting light 211, which is RCP in this example. The first switchable lens 122 is switched "on" in state 201, for example, switchable lens 122 is turned on to provide a +f1 focal length. Due to the properties of the first switchable lens 122, the polarization of light 211 is modified (e.g., changes from RCP to LCP). The second switchable lens 124 is switched "on" in state 201. Due to the characteristics of the second switchable lens 124, LCP incident light 211 results in a −f2 focal length. As such, state 201 provides a 50° FOV. Accordingly, an image for the large FOV state 201 can be presented by micro-display 110 (e.g., corresponding to light 211), which will be presented at viewpoint 102. Due to the larger (e.g., 50°) FOV, the image may be visible around a periphery of a user's vision (e.g., by pupil 103 of eye 101, or the like). As such, the image presented on micro-display 110 and rendered as viewpoint 102 during state 201 may be referred to herein as the low resolution FOV image.

FIG. 2B illustrates micro-display 110 of display stack 100 emitting light 212, which is also RCP. The first switchable lens 122 is switched "off" in state 202, for example, switchable lens 122 is turned on to provide a 0 focal length. As the first switchable lens 122 is "off" in state 202, the polarization of light 212 is not modified (e.g., not changed from RCP). The second switchable lens 124 is still switched "on" in state 202; that is, the second switchable lens 124 is static between states 201 and 202. Due to the characteristics of the second switchable lens 124, RCP incident light 212 results in a +f2 focal length. As such, state 202 provides a 20° FOV. Accordingly, an image for the small FOV state 202 can be presented by micro-display 110 (e.g., corresponding to light 212), which will be presented at viewpoint 102. Due to the smaller (e.g., 20°) FOV, the image may be visible at a center of a user's vision (e.g., by pupil 103 of eye 101, or the like). As such, the image presented on micro-display 110 and rendered as viewpoint 102 during state 202 may be referred to herein as the high resolution FOV image. It is noted, care is taken herein to distinguish between the images perceived at viewpoint 102 (which are referred to as high or low resolution FOV images) and the images presented on micro-display 110. However, in some descriptions, the images presented on micro-display 110 (or other displays described herein) may be referred to as high or low resolution images. This is not intended to imply that the resolution of image presented on micro-display 110 during the large FOV state 201 differs from the resolution of images presented on micro-display 110 during the small FOV state 202.

Instead, it is intended to imply that the resolution of the images as perceived at (or rendered to) viewpoint 102 differs.

Figure 3A:
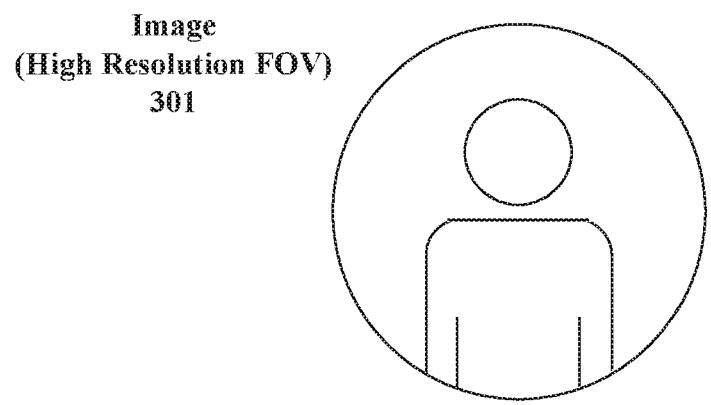
FIG. 3A illustrates a high resolution image.
Figure 3B:
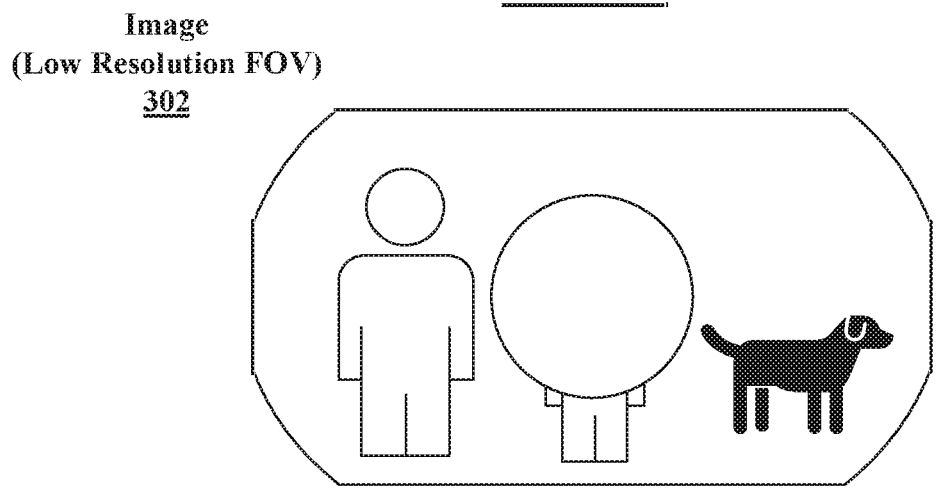
FIG. 3B illustrates a low resolution image.
Figure 3C:
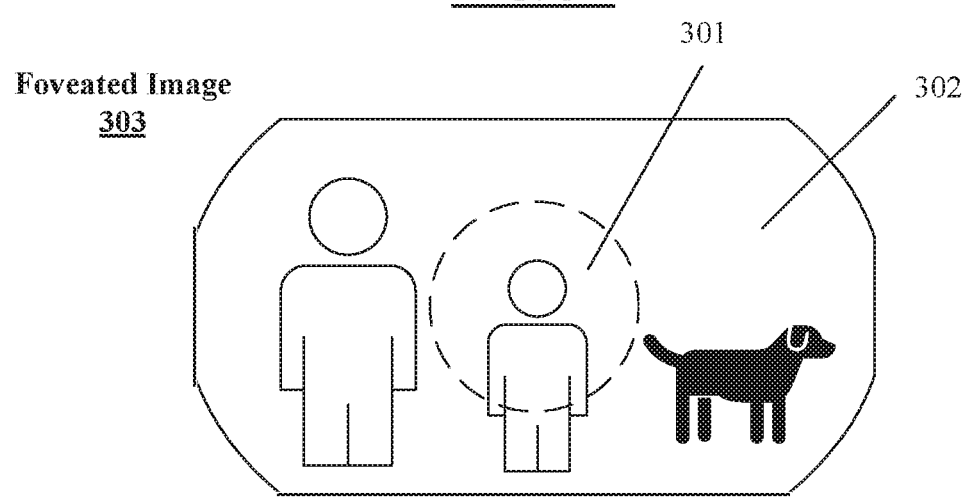
FIG. 3C illustrates a foveated image comprising the high resolution image of FIG. 3A and low resolution image of FIG. 3B.

FIGS. 3A-3C illustrate images that can be presented at viewpoint 102 by display stack 100. Specifically, FIG. 3A illustrates an image 301; FIG. 3B illustrates an image 302; and FIG. 3C illustrates a foveated image 303. Display stack 100 can be arranged to present foveated image 303 at viewpoint 102. Specifically, micro-display 110 can present image 302 during state 201 of display stack 100. Image 302 may correspond to the low resolution FOV and may be transmitted to viewpoint 102, via switchable lenses 122 and 124 of display stack 100, during state 201 corresponding to a larger FOV 140 (e.g., FOV of 50° as depicted in FIG. 2A). Likewise, micro-display 110 can present image 301 at state 202 of display stack 100. Image 301 may correspond to a high resolution FOV (e.g., smaller FOV than for image 302, or the like) and may be transmitted to viewpoint 102, via switchable lenses 122 and 124 of display stack 100, during state 202 corresponding to a small FOV 130 (e.g., FOV of 20° as depicted in FIG. 2B). Thus, foveated image 303 (e.g., the combination of images 301 and 302) can be presented at viewpoint 102. Where display stack 100 is arranged to present images 301 and 302 at a fast enough iteration (e.g., 120 Hz, or the like), the foveated image 303 will be viewed as a single composite image by a user.

As a specific example, the foveated display stack 100 can have a system length of 50 millimeters (mm). Thus, f1=25 mm and f2=50 mm. Furthermore, first switchable lens 122 of display stack 100 can have a diameter of 50 mm while second switchable lens 124 of display stack 100 can have a diameter of 25 mm. Assuming pupil 103 has a diameter of 5 mm and an eye 101 has an eye relief of 5 mm, viewpoint 102 may have an eyebox of 10 mm. Given these measurements, display stack 100 can provide 102 cycles per degree (cpd) for image 301 presented with a 20° FOV in state 202 (e.g., presented proximate pupil 103) and 40 cpd for image 302 presented with a 50° FOV in state 201 (e.g., presented around the periphery of pupil 103).

Figure 4:
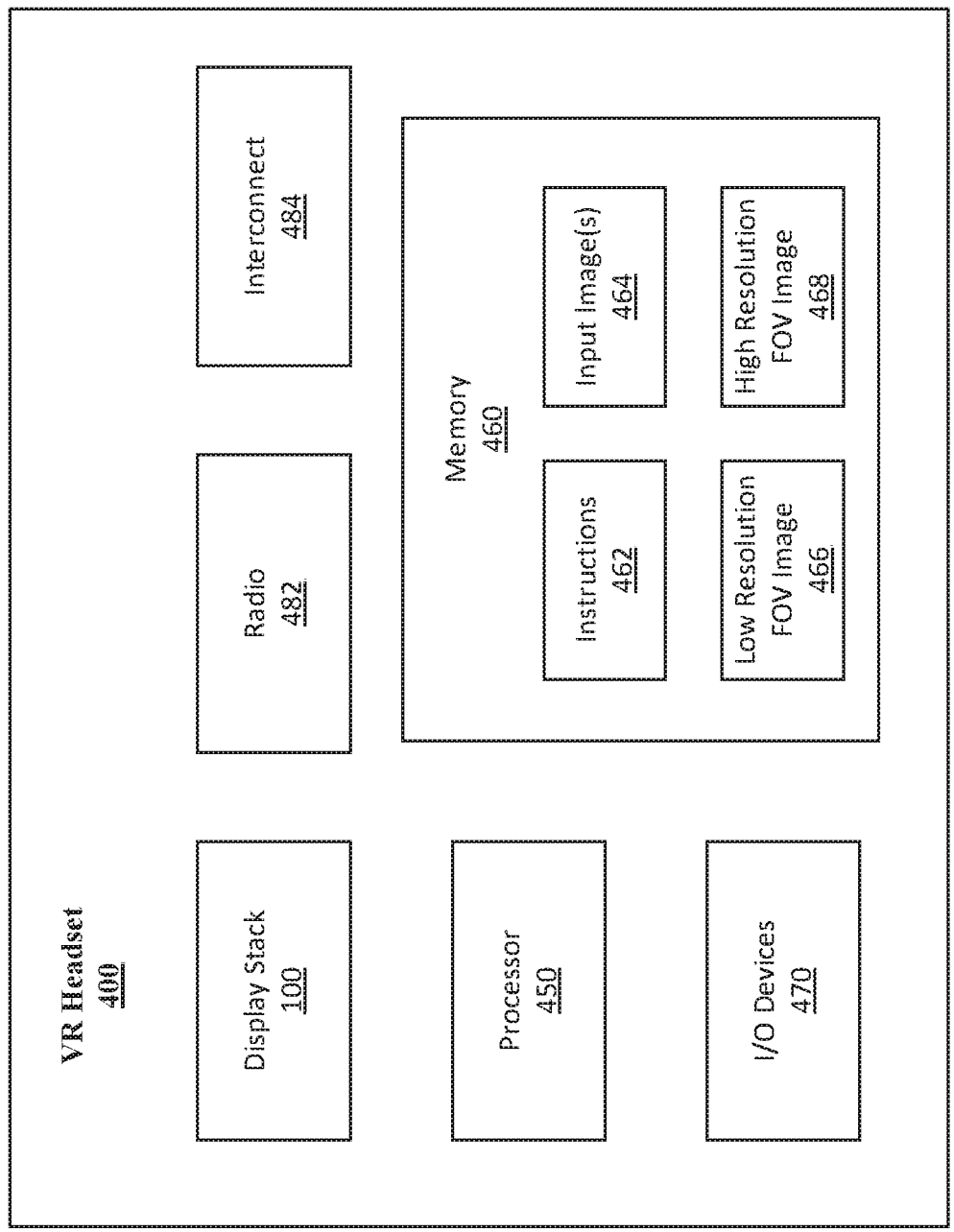
FIG. 4 illustrates a virtual reality headset.

Display stack 100 can be incorporated into VR system, such as a wearable VR headset. FIG. 4 illustrates a block diagram of VR system 400 incorporating display stack 100. VR system 400 can be arranged to provide a virtual reality (VR) image (e.g., at viewpoint 102). The VR system 400 includes display stack 100, processor 450, memory 460, a number of input and/or output (I/O) devices 470, a radio 482, and an interconnect 484. Memory 460 comprises instructions 462, a number of input images 464, a low resolution FOV image 466 and a high resolution FOV image 468.

In general, processor 450 may include circuitry or processor logic arranged to execute instructions. For example, processor 450 may be any of a variety of commercial processors. In some examples, the processor 450 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 450 may include graphics processing portions and may include dedicated memory, multiple-threaded processing and/or some other parallel processing capability. In other examples, processor 450 can be an application specific integrated circuit (ASIC), a field programmable gate array (FPGA), or other such circuitry.

Memory 460 may include logic, a portion of which includes arrays of integrated circuits, forming non-volatile memory to persistently store data or a combination of non-volatile memory and volatile memory. It is to be appreciated, that the memory 460 may be based on any of a variety of technologies. In particular, the arrays of integrated circuits included in memory 460 may be arranged to form one or more types of memory, such as, for example, dynamic random access memory (DRAM), NAND memory, NOR memory, or the like.

I/O devices 470 may include one or more components to provide input to or to provide output from the system 400. For example, I/O devices 470 can include a speaker, a microphone, a camera, a light emitting diode (LED), a number of LEDs, a button, a haptic feedback device, or the like.

Radio 482 may be any circuitry (including baseband circuitry, etc.) configured to communicate signals via a wireless broadcast. For example, the radio 482 may be a Wi-Fi Direct radio, a Bluetooth radio, a BLE radio, an RFID radio, a ZigBee radio, an Ultrasound radio, a cellular radio, or the like. The radio 482 may be operably coupled to an antenna (not shown) and arranged to communicate wireless signals via the antenna.

Interconnect 484 may include logic and/or features to support a communication interface. For example, the interconnect 484 may include one or more interfaces that operate according to various communication protocols or standards to communicate over direct or network communication links. Direct communications may occur via use of communication protocols or standards described in one or more industry standards (including progenies and variants). For example, the interconnect 484 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

System 400 can be provided or implemented in a frame or headset adapted to be worn on a user's head and arranged to position the display stack 100 in the line of sight of the wearer. For example, system 400 can be implemented as a helmet, a visor, glasses, goggles, a monocle, or the like.

Figure 5:
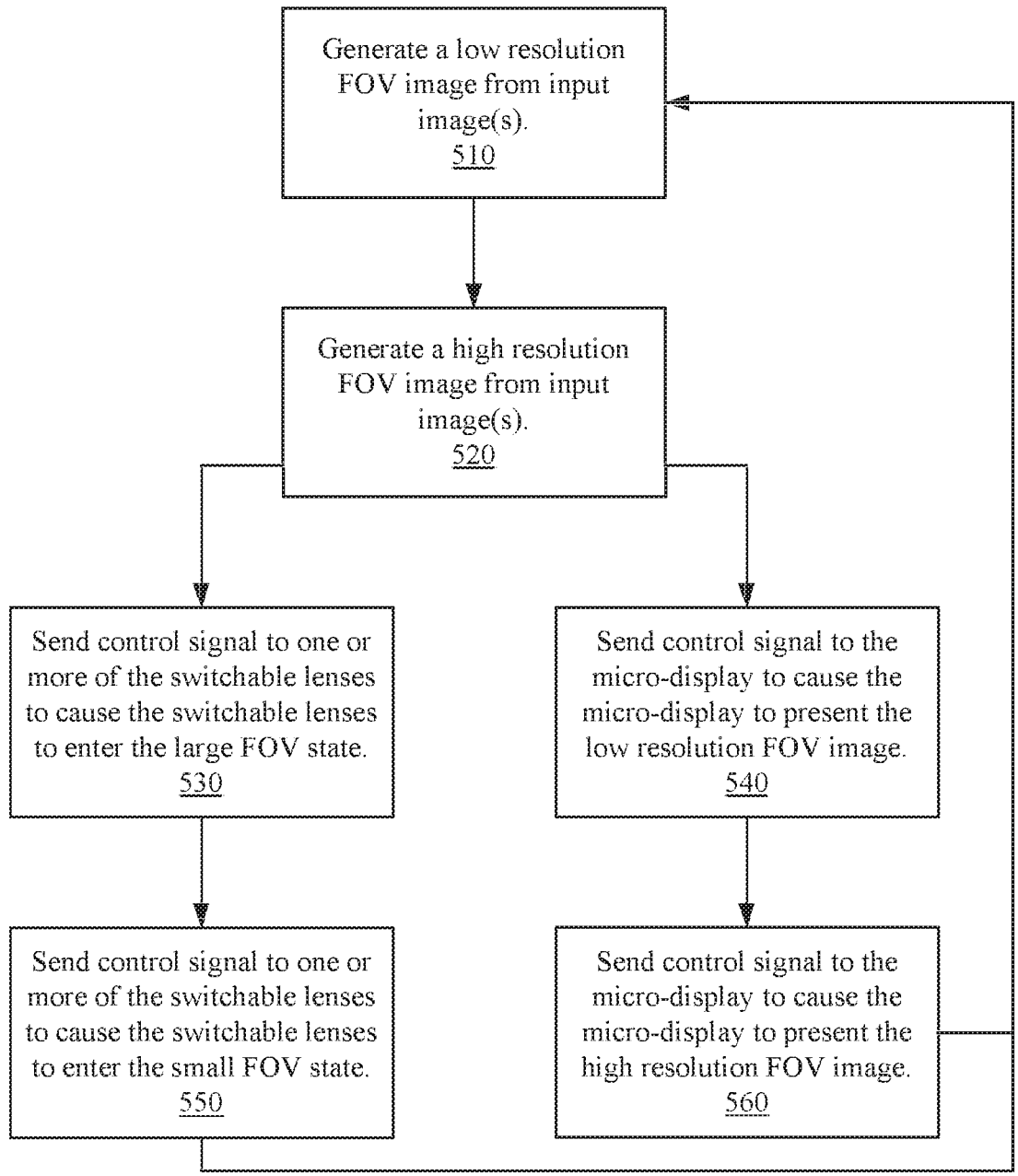
FIG. 5 illustrates a first logic flow.

During operation, system 400 can be arranged to present a foveated image as described herein. Illustrative operation of system 400 is described with respect to FIG. 5, which illustrates a logic flow 500 to present a foveated image. Logic flow 500 can begin at block 510 "generate a low resolution FOV image from the input image(s)". At block 510, processor 450 can execute instructions 462 to cause processor 450 to generate the low resolution FOV image 466 from the input image(s) 464. For example, processor 450 can execute instructions to crop, redact, encode, and/or compress an image to generate the low resolution FOV image 466.

Continuing to block 520 "generate a high resolution FOV image from the input image(s)". At block 520, processor 450 can execute instructions 462 to cause processor 450 to generate the high resolution FOV image 468 from the input image(s) 464. For example, processor 450 can execute instructions to crop, redact, encode, and/or compress an image to generate the high resolution FOV image 468. This is described in greater detail below (e.g., in conjunction with FIGS. 6, 7A, and 7B).

Continuing to block 530 "send a control signal to one or more of the switchable lenses to cause the switchable lenses to enter the large FOV state" and block 540 "send a control signal to the micro-display to cause the micro-display to present the low resolution FOV image" processor 450, in executing instructions 462, can send control signals to micro-display 110 to cause micro-display 110 to present (e.g., display, or the like) the low resolution FOV image 466 and other control signals to components of display stack 100 (e.g., switchable lens 122 and/or switchable lens 124) to cause the components to enter the large FOV state 201 to present the low resolution image 464 at the large FOV 140. In some examples, blocks 530 and 540 can be implemented concurrently; while in other examples, block 530 can be implemented followed by block 540.

Continuing to block 550 "send a control signal to one or more of the switchable lenses to cause the switchable lenses to enter the small FOV state" and block 560 "send a control signal to the micro-display to cause the micro-display to present the high resolution FOV image" processor 450, in executing instructions 462, can send control signals to micro-display 110 to cause micro-display 110 to present (e.g., display, or the like) the high resolution FOV image 468 and other control signals to components of display stack 100 (e.g., switchable lens 122 and/or switchable lens 124) to cause the components to enter the small FOV state 202 to present the high resolution image 468 at the small FOV 130. In some examples, blocks 550 and 560 can be implemented concurrently; while in other examples, block 540 can be implemented followed by block 560.

Figure 6:
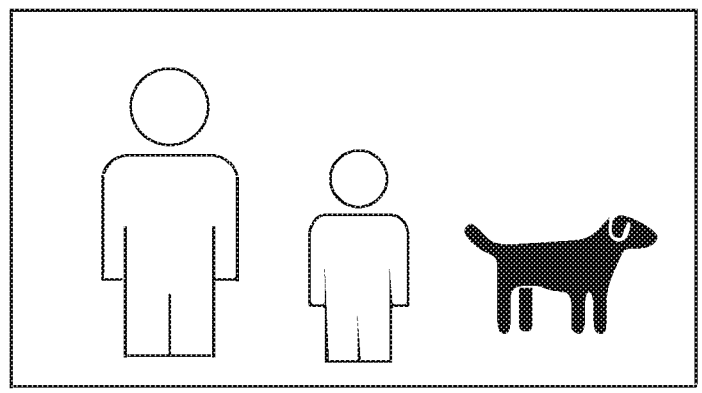
FIG. 6 illustrates an input image.

In some implementations a single input image 464 is used to generate both the low and high resolution FOV images 466 and 468. For example, FIG. 6 illustrates a single input image 664. At block 510, processor 450 can execute instructions 462 to generate low resolution FOV image 466. For example, processor 450 can crop, redact, and compress input image 664 to generate low resolution FOV image 466 (e.g., corresponding to image 302, or the like). Likewise, at block 520, processor 450 can execute instructions 462 to generate high resolution FOV image 468. For example, processor 450 can crop input image 664 to generate high resolution FOV image 468 (e.g., corresponding to image 301, or the like).

Figure 7A:
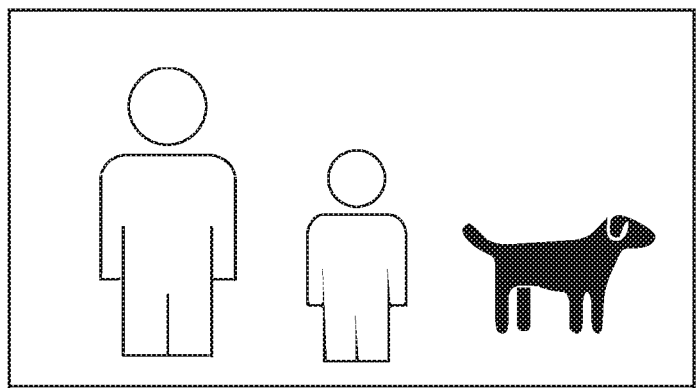
FIGS. 7A and 7B illustrate a pair of input images.
Figure 7B:
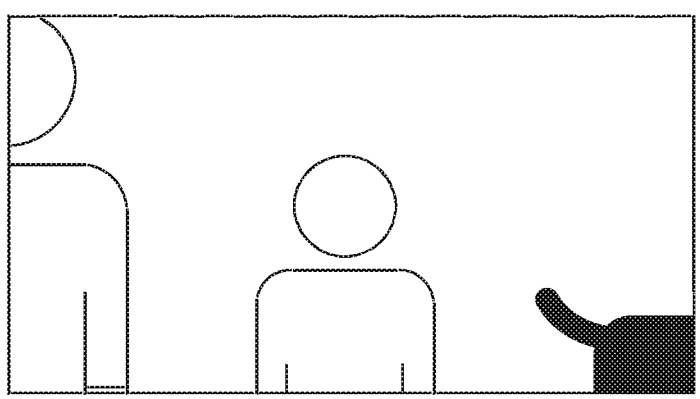

In some implementations multiple input image 464 are used to generate both the low and high resolution FOV images 466 and 468. the multiple input images may have different fields of view. For example, FIGS. 7A and 7B illustrate input image 764-1 and 764-2, respectively. At block 510, processor 450 can execute instructions 462 to generate low resolution FOV image 466. For example, processor 450 can crop and redact input image 764-1 to generate low resolution FOV image 466 (e.g., corresponding to image 302, or the like). Likewise, at block 520, processor 450 can execute instructions 462 to generate high resolution FOV image 468. For example, processor 450 can crop input image 764-2 to generate high resolution FOV image 468 (e.g., corresponding to image 301, or the like).

With some examples, logic flow 500 can be offloaded from system 400. For example, logic flow 500 can be implemented on a computing system provided by the cloud or by a computing system (e.g., a smart phone, laptop, tablet, etc.) coupled to system 400 (e.g., via radio 482, or the like). As such, images 464, 466, and/or 468 can be rendered and/or generated by the offload device and then information elements including indications of the low resolution FOV images 466 and high resolution FOV image 468 can be sent to system 400 to such that system can present a foveated image (e.g., image 303, or the like) as described herein.

Figure 8A:
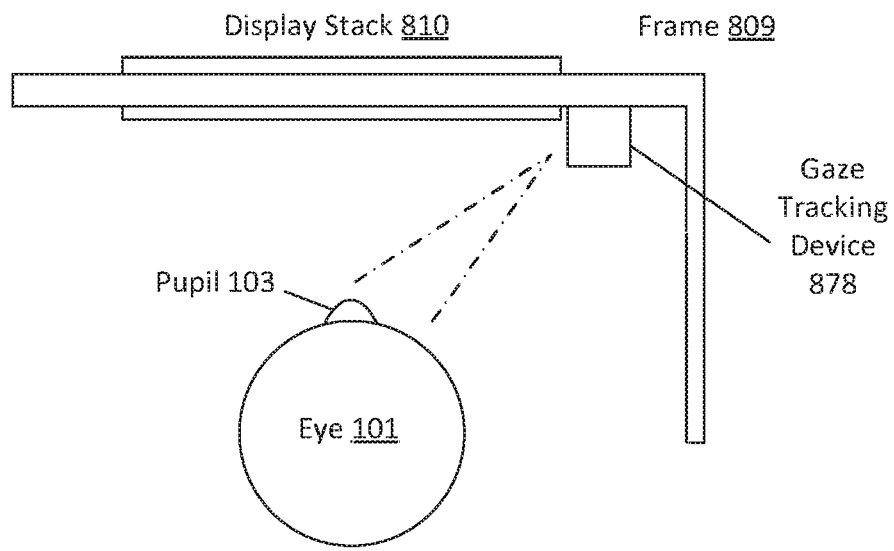
FIG. 8A illustrates a virtual reality system.
Figure 8B:
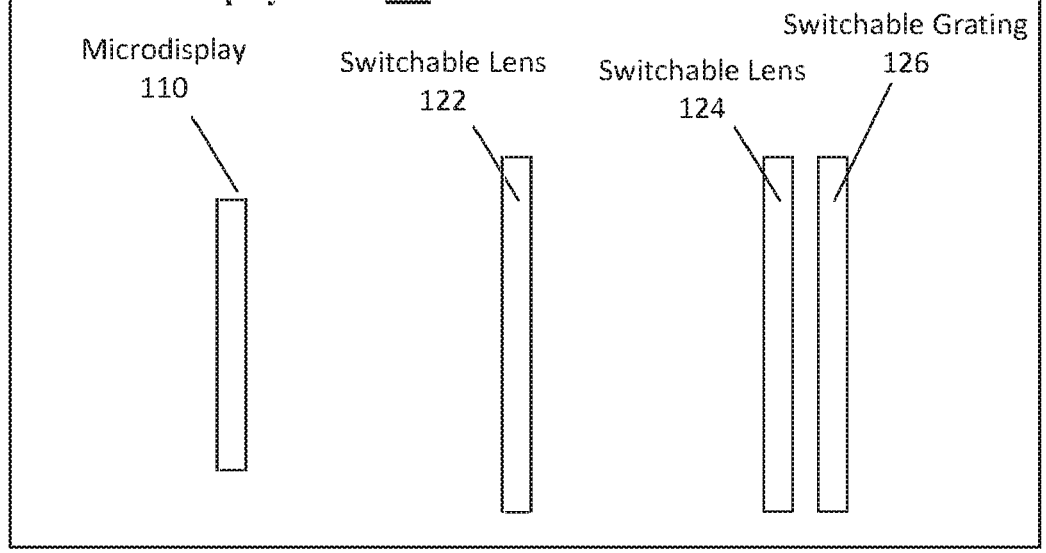
FIG. 8B illustrates a second foveated display stack of the virtual reality system of FIG. 8A.

In some implementations, the focus of the foveated image can be changed. That is, the area of focus of the foveated image, or the location of the high resolution portion 301 of the foveated image 303, can be changed. Said differently, the location of the small FOV image within the large FOV image can be changed. For example, the focus can be changed to correspond to an eye gaze (e.g., gaze of eye 101, or the like). FIGS. 8A and 8B illustrates a portion of VR system 801, which may be arranged to provide a dynamic location for the small FOV within the large FOV. As illustrated, system 800 includes a foveated display stack 810 disposed within a frame 809 and gaze tracking device 878. System 800, although not shown, can further include features of system 400. For example, system 801 can include processor 450 and memory 460. Instructions 462 when implemented for system 801, can be executed by processor 450 to track a gaze of eye 101 (e.g., location of pupil 103, or the like) based on signals received from gaze tracking device 878. For example, processor 450 can execute instructions 462 to capture images of eye 101 (e.g., from gaze tracker 878) and determine a gaze or location of pupil 103 based on the captured images. As another example, processor 450 can execute instructions 462 to cause gaze tracker 878 to emit light beams (e.g., infrared, or the like) at eye 101, detected reflected light from eye 101 responsive to the emitted light beams, and send signals indicative of the detected reflected light to processor 450. Processor 450, in executing instructions 462, can determine gaze of eye 101 based on the received signals indicative of the detected reflected light.

Figure 9A:
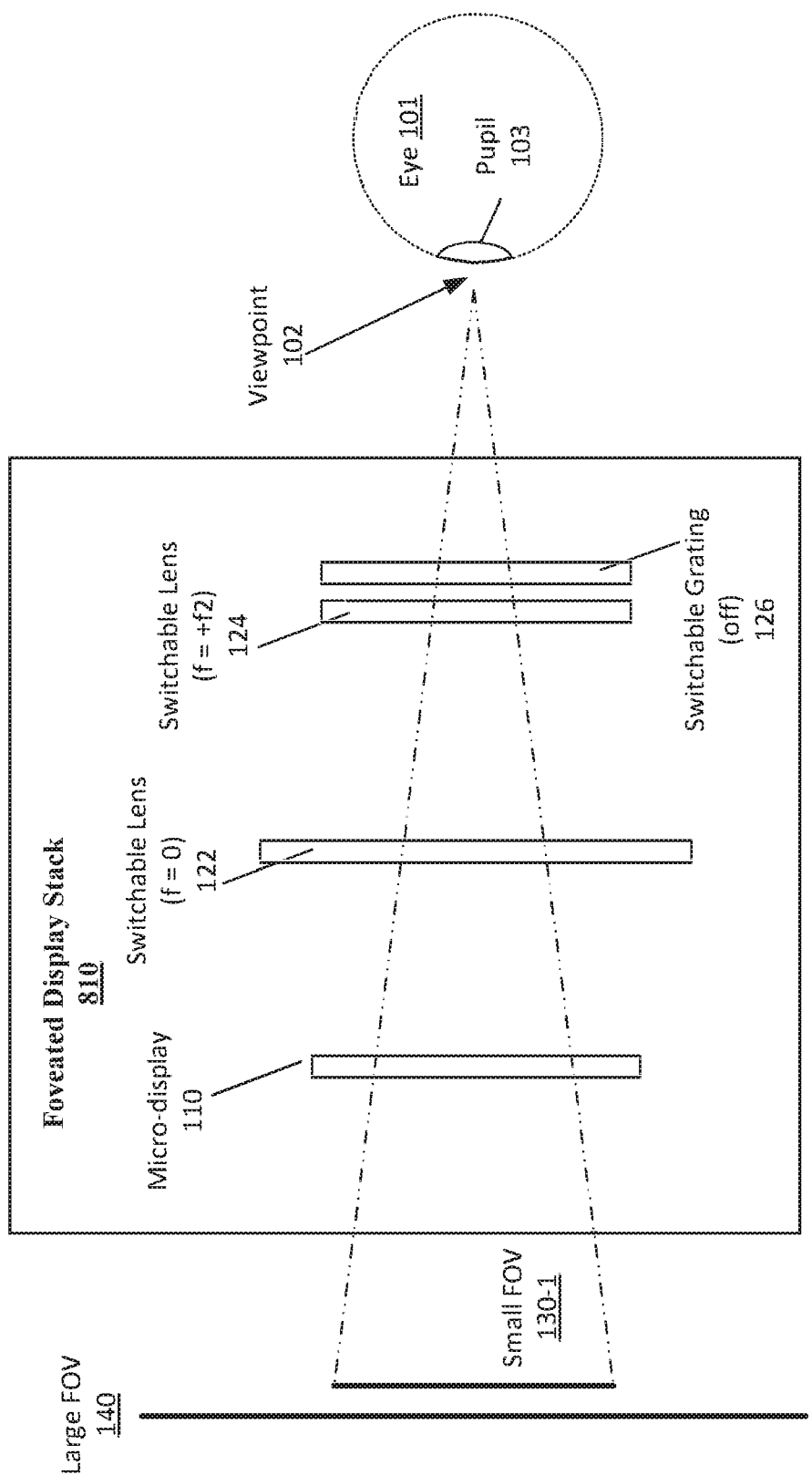
FIGS. 9A and 9B illustrate an the second foveated display stack of FIG. 8B in a first small field of view state and a second small field of view state.
Figure 9B:
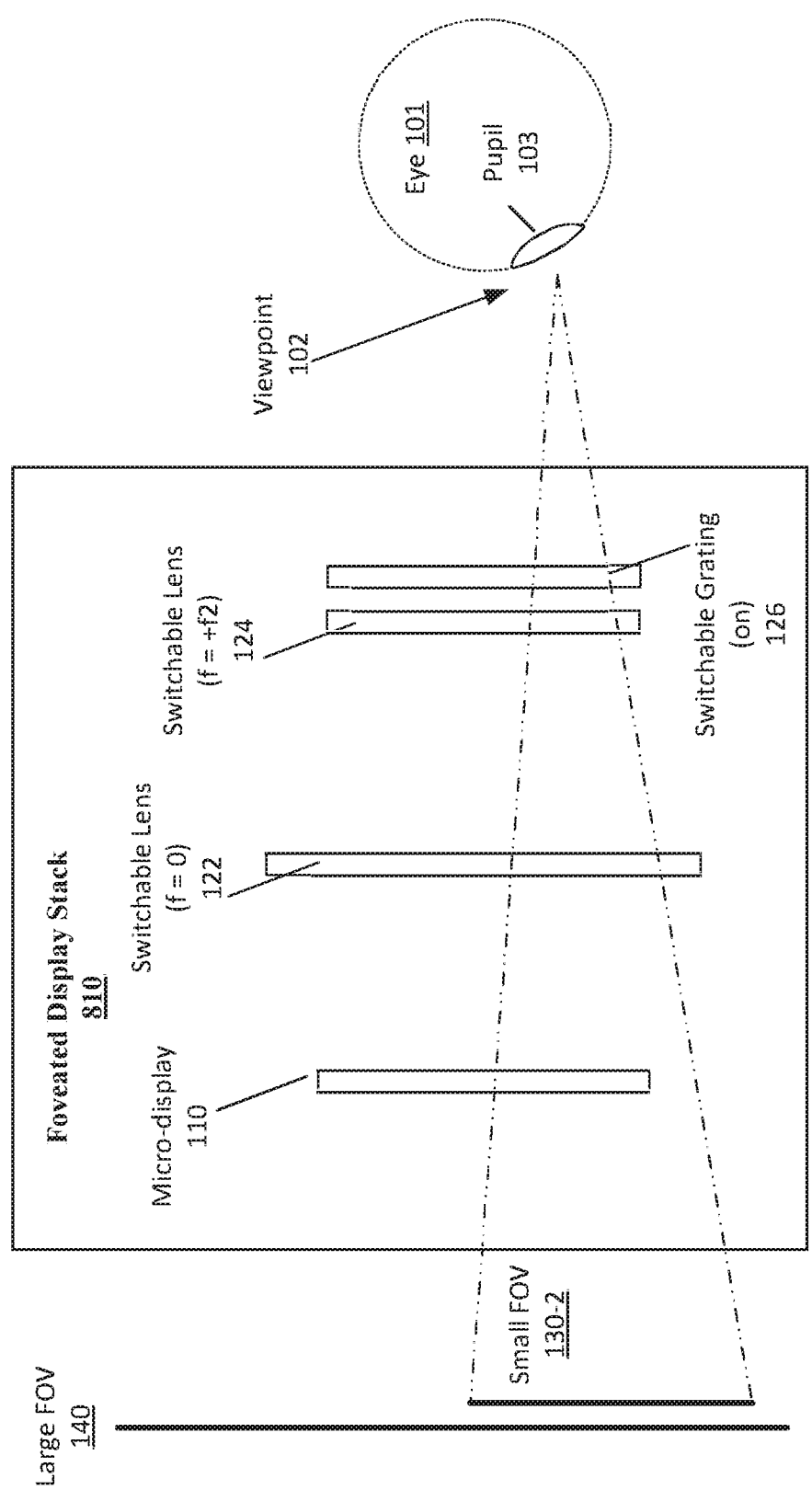

Foveated display stack 810 can include features of foveated display stack 100, such as, micro-display 110 and switchable lenses 122 and 124. Additionally, display stack 810 can include a switchable grating 126. Switchable grating 126 can be any of a variety of gratings that modulate transmitted light by manipulating the phase of the light. In some examples, switchable grating 126 can be a combination lens and grating. For example, switchable grating can be a geometric phase grating (GPG). During operation, switchable lenses 122 and 124 can operate as described above, to provide either a large FOV 140 or a small FOV 130. Switchable grating 126 can be activated where switchable lenses 122 and 124 are configured to provide a small FOV 130 view of a different location in the field. For example, FIGS. 9A and 9B illustrate an example of display stack 810 presenting high resolution FOV image 466 in a small FOV 130 at different locations, based on eye gaze. As illustrated in FIG. 9A, switchable lens 122 can be "off" while switchable lens 124 is "on" to provide a small FOV 130. In this case, switchable grating 126 can be "off" so as not to substantially modify the path of light to provide the small FOV 130-1 at a location central to the large FOV. Conversely, as illustrates in FIG. 9B, switchable grating 126 can be activated or turned "on" to modify a trajectory or angle of travel of light to move a perceived location of the small FOV 130-2 respective to the large FOV 140, thereby changing the location of the small FOV 130 within the overall field of the large FOV 140.

With some examples, switchable grating 126 may include multiple gratings or multiple states to provide for various locations of the small FOV 130 relative to the large FOV. For example, FIG. 10 illustrates a mapping 1001 showing different locations where small FOV 130 (e.g., corresponding to high resolution image 301) can be presented relative to the large FOV 140. It is noted, that this mapping of potential locations of the small FOV 130 relative to the large FOV 140 (e.g., or location within the foveated image 303) is not to scale.

Figure 11:
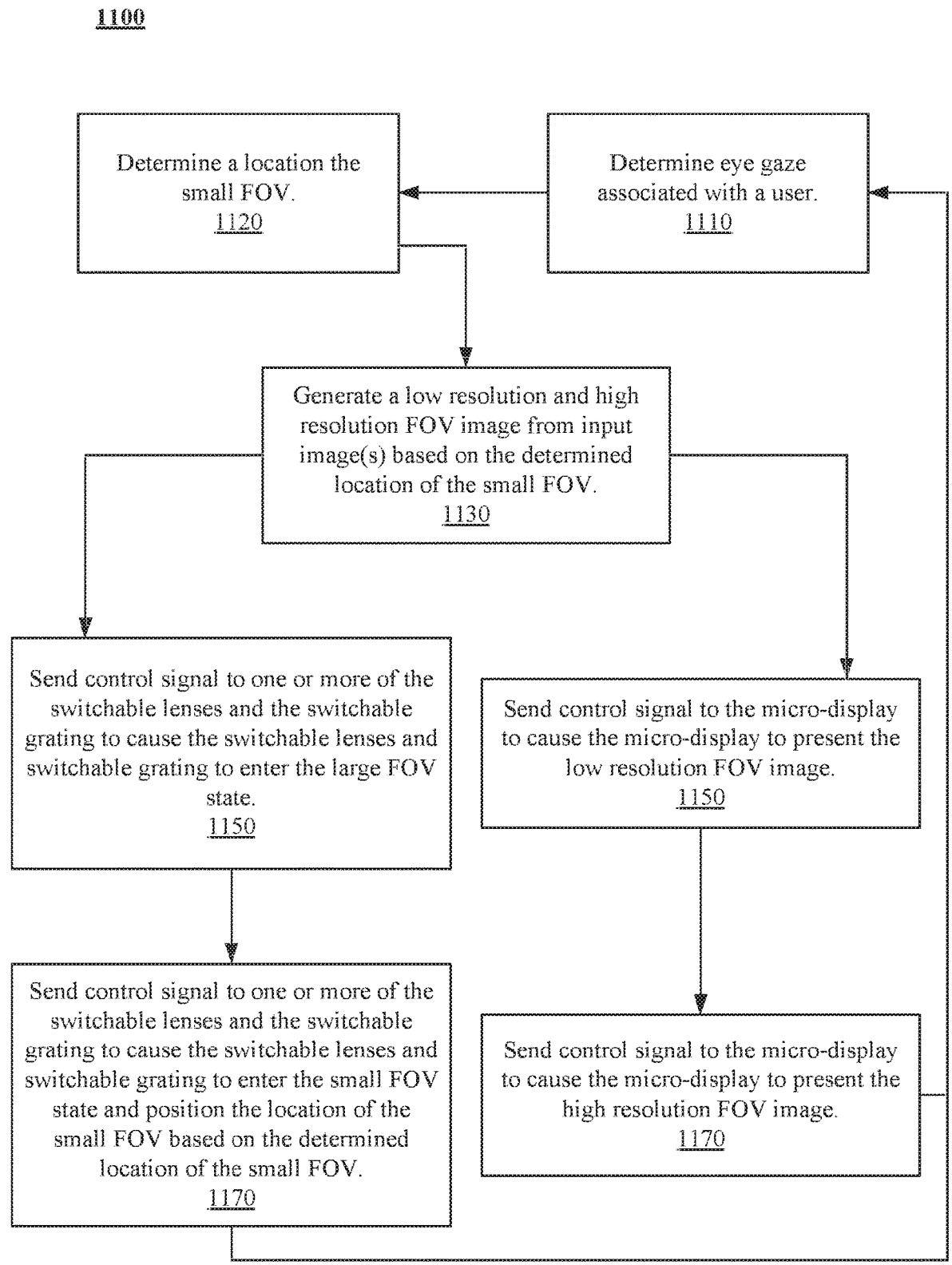
FIG. 11 illustrates a second logic flow.

FIG. 11 illustrates a logic flow 1100 to present a foveated image with a dynamically movable high resolution FOV portion (e.g., dynamically moveable small FOV 130). Logic flow 1100 can begin at block 1110. At block 1110 "determine eye gaze associated with a user" processor 450, in executing instructions 462, can receive signals from gaze tracking device 872 and determine a gaze of eye 101 based on the received signals. Continuing to block 1120 "determine a location of the small FOV" processor 450, in executing instructions 462, can determine a location of the small FOV 130 relative to the large FOV 140. For example, processor 450, in executing instructions 462, can select one of the small FOV locations depicted in FIG. 10, based on the determined gaze.

Continuing to block 1130 "generate a low resolution and high resolution FOV image from the input image(s) based on the determined location of the small FOV". At block 1130, processor 450 can execute instructions 462 to cause processor 450 to generate both the low resolution FOV image 466 and the high resolution FOV image 468 from the input image(s) 464 such that the high resolution FOV image corresponds to the focus location (e.g., location of the small FOV 130) and the redacted portion of the low resolution FOV image also corresponds to the focus location (e.g., location of the small FOV 130).

Continuing to block 1140 "send a control signal to one or more of the switchable lenses and the switchable grating to cause the switchable lenses and switchable grating to enter the large FOV state" and block 1150 "send a control signal to the micro-display to cause the micro-display to present the low resolution FOV image" processor 450, in executing instructions 462, can send control signals to micro-display 110 to cause micro-display 110 to present (e.g., display, or the like) the low resolution FOV image 466 and other control signals to components of display stack 100 (e.g., switchable lens 122, switchable lens 124, and/or switchable grating 126) to cause the components to enter the large FOV state 201 to present the low resolution FOV image 464 at the large FOV 140.

Continuing to block 1160 "send a control signal to one or more of the switchable lenses and the switchable grating to cause the switchable lenses and switchable grating to enter the small FOV state and position the location of small FOV based on the determined location of the small FOV" and block 1170 "send a control signal to the micro-display to cause the micro-display to present the high resolution FOV image" processor 450, in executing instructions 462, can send control signals to micro-display 110 to cause micro-display 110 to present (e.g., display, or the like) the high resolution FOV image 468 and other control signals to components of display stack 100 (e.g., switchable lens 122, switchable lens 124, and/or switchable grating 126) to cause the components to enter the small FOV state 202 to present the high resolution FOV image 468 at the small FOV 130 and to position (or cause the small FOV to be positioned) at the determined location for the small FOV.

Figure 12A:
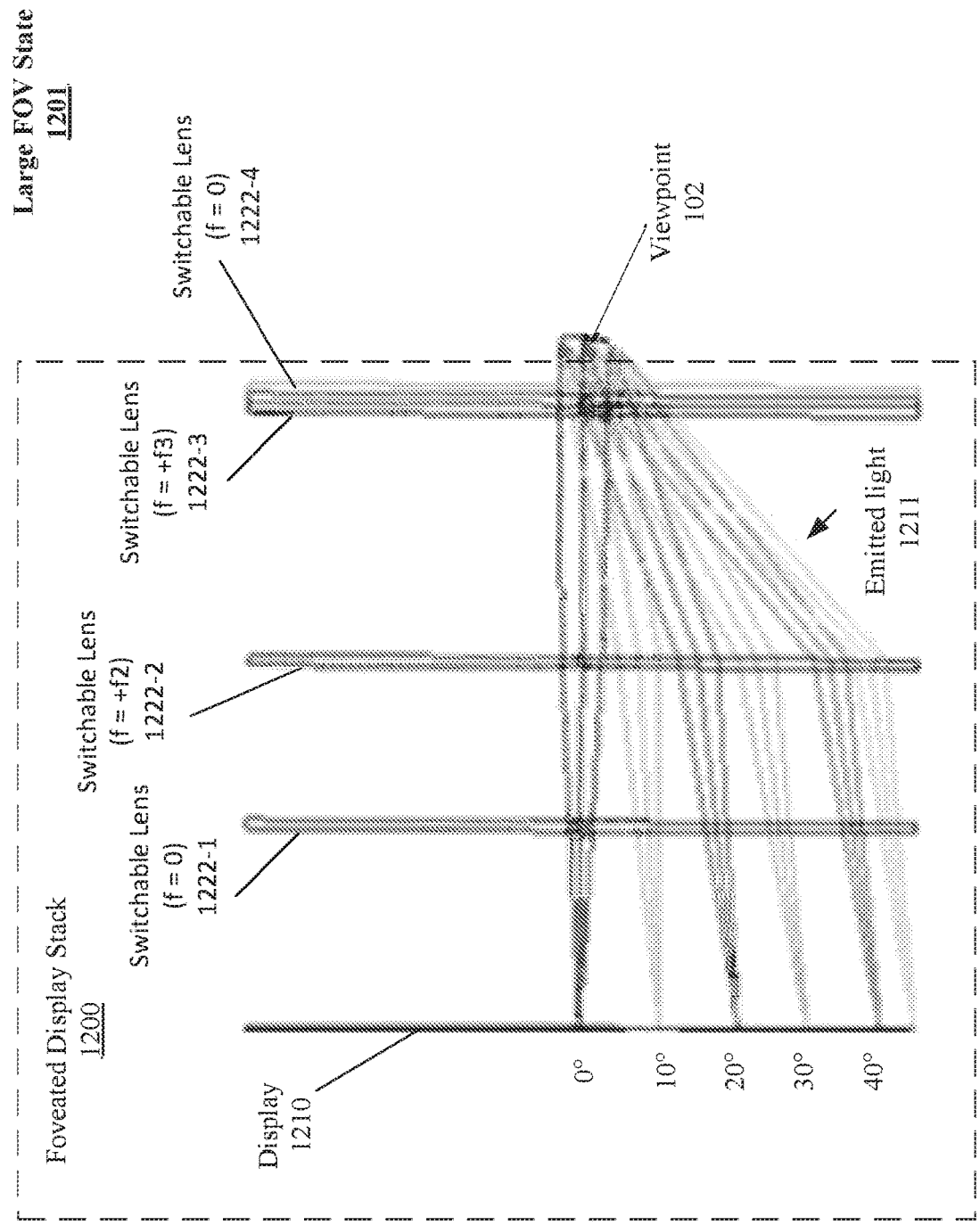
FIG. 12A illustrates a third foveated display stack in a large field of view state.
Figure 12B:
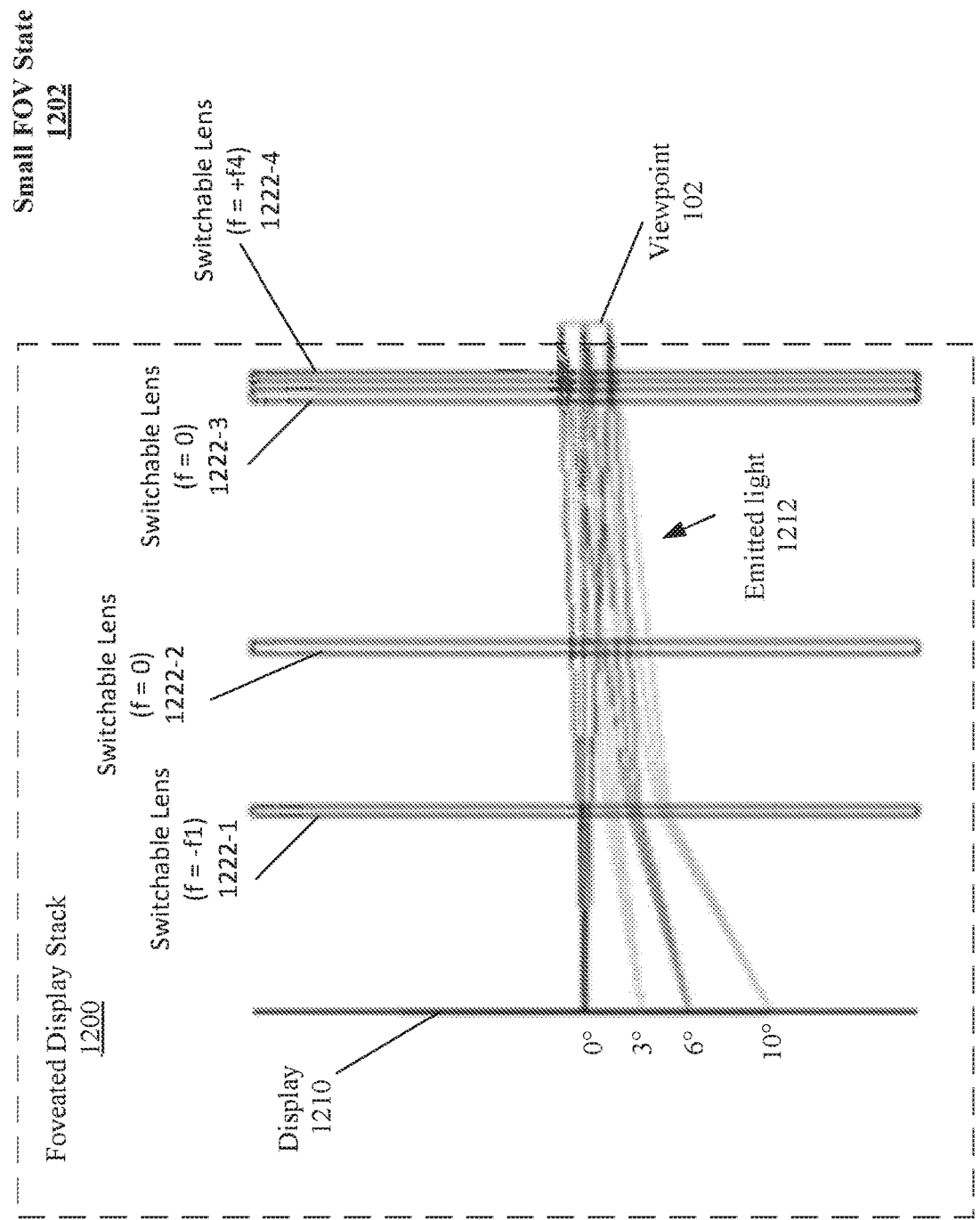
FIG. 12B illustrates the third foveated display stack in a small field of view state.

In some implementations, a foveated display stack as described herein can be implemented with more than two switchable lenses. FIGS. 12A and 12B illustrate light rays for a display stack 1200, implemented with more than two switchable lenses, in two states. The first state 1201, depicted in FIG. 12A, illustrates a state 1201 of display stack 1200 corresponding to a low resolution large field of view (FOV); while the second state 1202, depicted in FIG. 12B, illustrates a state 1202 of display stack 1200 corresponding to a high resolution small FOV state. As illustrated in these figures, display stack 1200 includes a display 1210 and four switchable lenses 1222-1, 1222-2, 1222-3, and 1222-4.

As shown in FIG. 12A, display 1210 of display stack 1200 is emitting light 1211 corresponding to the low resolution FOV image (e.g., low resolution FOV image 466). The first switchable lens 1222-1 and the last switchable lens 1222-4 are switched "off" in state 1201, for example, switchable lenses 1222-1 and 1222-4 off provides a 0 focal length. The second and third switchable lenses 1222-2 and 1222-3 are switched "on" in state 1201, to provide for example, a +f2 and +f3 focal length, respectively. In this example, system 1200 in state 1201 provides a 90° FOV. Accordingly, a low resolution FOV image can be presented by micro-display 110 (e.g., corresponding to light 1211), which will be presented at viewpoint 102. Due to the larger FOV (e.g., 90°), the low resolution FOV image may be visible around a periphery of a user's vision (e.g., by pupil 103 of eye 101, or the like).

FIG. 12B illustrates display 1210 of display stack 1200 emitting light 1212 corresponding to the high resolution FOV image (e.g., high resolution image FOV 468). The first switchable lens 1222-1 and the last switchable lens 1222-4 are switched "on" in state 1202, for example, switchable lenses 1222-1 and 1222-4, to provide for example, a −f1 and +f4 focal length, respectively. Whereas, the second and third switchable lenses 1222-2 and 1222-3 are switched "off" in state 1202 to provide a focal length of 0. In this example, system 1200 in state 1202 provides a 20° FOV. Accordingly, a high resolution FOV image can be presented by display 1210 (e.g., corresponding to light 1212), which will be presented at viewpoint 102. Due to the smaller FOV (e.g., 20°), the high resolution FOV image may be visible at a center of viewpoint 102 (or a location based on gaze). Where states 1201 and 1202 are iterated at a high enough frequency, the low resolution FOV image and the high resolution FOV image may be perceived as a single foveated image as described herein.

Figure 13A:
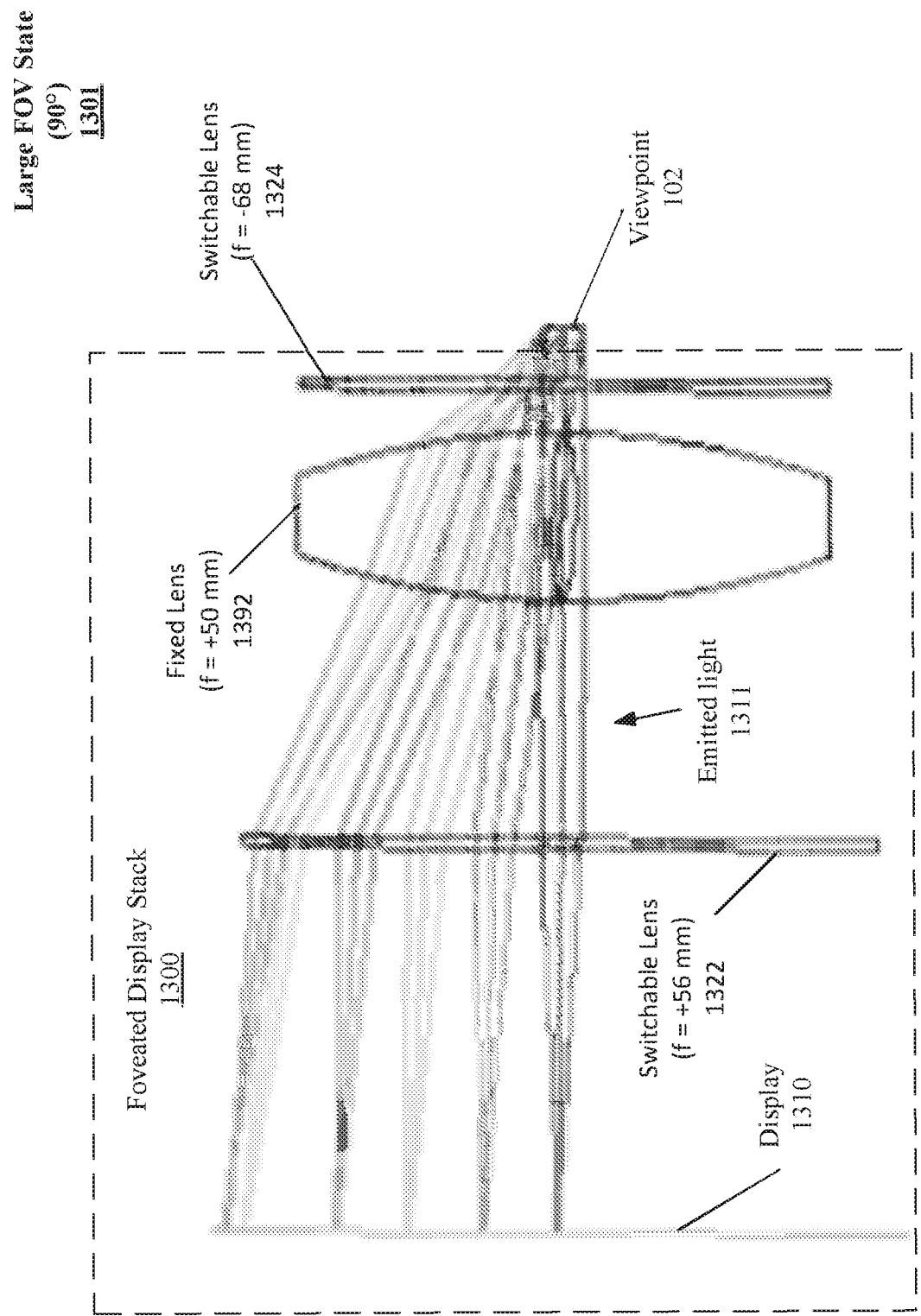
FIG. 13A illustrates a fourth foveated display stack in a large field of view state.
Figure 13B:
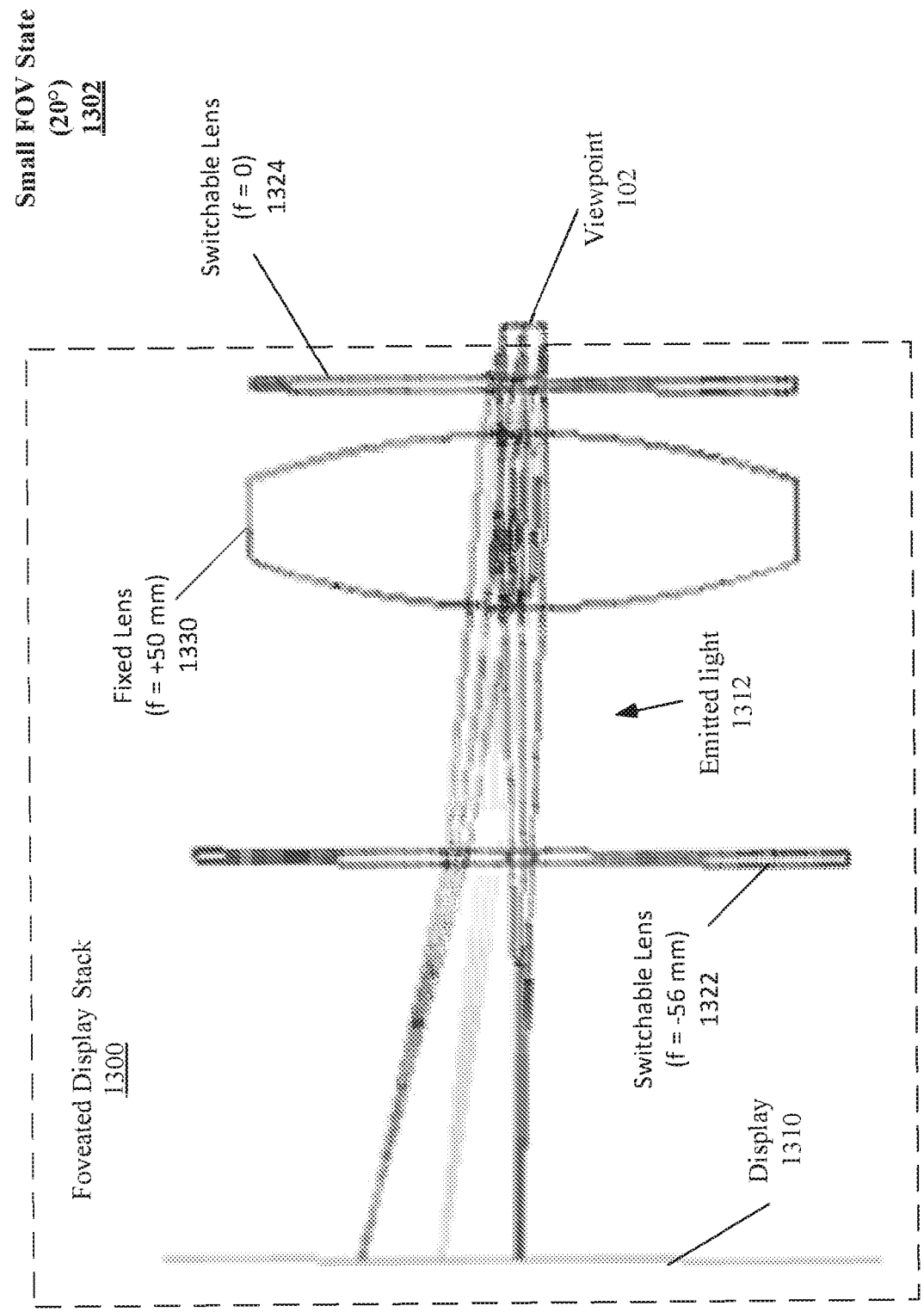
FIG. 13B illustrates the fourth foveated display stack in a small field of view state.

In some implementations, a foveated display stack as described herein can be implemented with a combination of switchable lenses with a number of fixed refractive lenses also. FIGS. 13A and 13B illustrate light rays for display stack 1300 in two states. The first state 1301, depicted in FIG. 13A, illustrates a state 1301 of display stack 1300 corresponding to a low resolution large field of view (FOV); while the second state 1302, depicted in FIG. 13B, illustrates a state 1302 of display stack 1300 corresponding to a high resolution small FOV state. Display stack 1300 includes a display 1310, switchable lenses 1324 and 1326 as well as fixed lens 1392. Fixed lens 1392 can be an of a variety of refractive lenses with a fixed focal length.

As shown in FIG. 13A, display 1310 of display stack 1300 is emitting light 1311, corresponding to low resolution FOV image 466. The first and second switchable lenses 1322 and 1324 are switched "on" in state 1301. Accordingly, low resolution image FOV 466 may be presented at viewpoint 102. Due to the larger (e.g., 90°) FOV, the low resolution FOV image may be visible around a periphery of a user's vision (e.g., by pupil 103 of eye 101, or the like).

FIG. 13B illustrates display 1310 of display stack 1300 emitting light 1312, corresponding to high resolution FOV image 468. The first switchable lens 1322 is switched "on" in state 1302 while the second switchable lens 1324 is "off" in state 1302. Accordingly, high resolution FOV image 468 may be presented at viewpoint 102. Due to the smaller (e.g., 14°) FOV, the high resolution FOV image may be visible at a center of a user's vision (e.g., by pupil 103 of eye 101, or the like).

Figure 14:
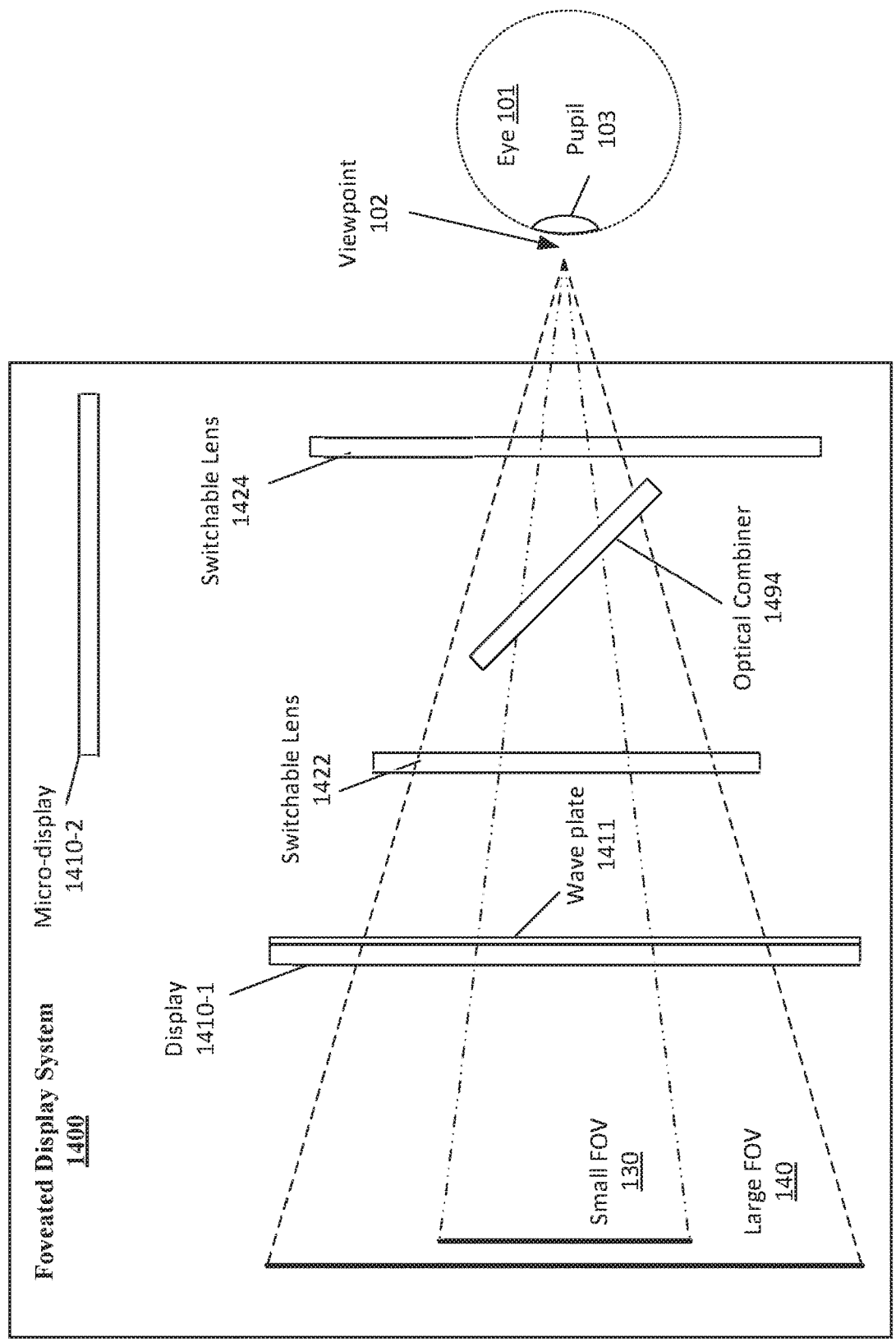
FIG. 14 illustrates a first foveated display system.

In some implementations, a foveated display can comprise multiple displays. For example, FIG. 14 illustrates a foveated display system 1400 comprising a first display 1410-1 and a second micro-display 1410-2. An advantage to system 1400 over single display foveated display systems (e.g., display stack 100, etc.) is that the displays 1410 of system 1400 do not need to be switchable at fast rate (e.g., 120 Hz or greater) to switch between the high and low resolution states. As such, slower switchable displays (or displays with a lower refresh rate) might be used. Display system 1400 further includes first switchable lens 1422 and second switchable lens 1424 as well as optical combiner 1494. It is noted, that display 1410-1 can be a conventional display and need have as high pixel density as micro-display 1410-2. For example, display 1410-1 can be a virtual reality (VR) screen, a mobile device (e.g., smartphone, tablet, or the like) screen. Additionally, display 1410-1 can have a pixel density of between 400 and 800 PPI.

In general, system 1400 includes a large FOV light path and a small FOV light path. More particularly, display 1410-1 can emit light corresponding to low resolution FOV image 466, the light will be transmitted by the switchable lenses 1422 and 1424, as well as the optical combiner 1494. As such, the low resolution FOV image 466 can be presented at viewpoint 102 and perceived at large FOV 140. Likewise, micro-display 1410-2 can emit light corresponding to high resolution FOV image 468, the light will be transmitted by switchable lens 1424 and optical combiner 1494. As such, the high resolution FOV image 468 can be presented at viewpoint 102 and perceived at small FOV 130.

In some examples, system 1400 is arranged to operate where light in the large FOV path has a different polarization to that of light in the small FOV path. As such, system 1400 may include a quarter-wave plate or a half-wave plate 1411 arranged to change a polarization of light emitted by one or more of the displays 1410. For example, at depicted, system 1400 includes quarter-wave plate or half-wave plate 1411 disposed proximate to display 1410-1. Thus, light emitted by display 1410-1 may be changed (e.g., from RCP to LCP, or vice versa).

Figure 15:
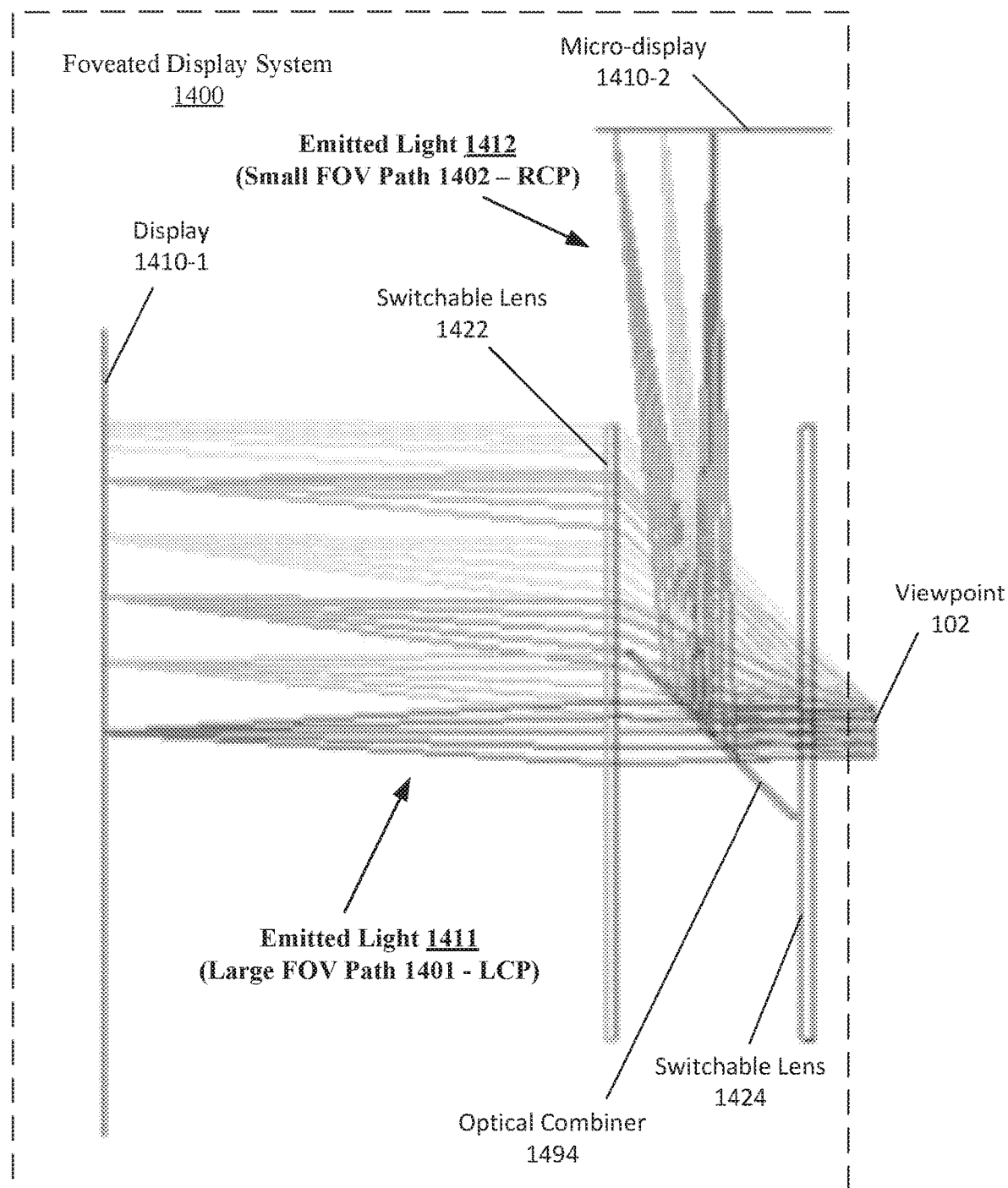
FIG. 15 illustrates a large field of view light path and a small field of view light path of the foveated display system of FIG. 14.

FIG. 15 illustrates light rays 1411 and 1412 for display system 1400 corresponding to both large FOV state 1401 and small FOV state 1402. Said differently, this figure illustrates both large and small FOV light paths. As illustrates, light 1411, which is LCP light in this example, is emitted by display 1410-1. Light 1411 is transmitted by switchable lens 1422, which may have a focal length of +26.8 mm in this example. Similarly, light 1412, which is RCP light in this example, is emitted by micro-display 1410-2. Light 1411 and 1412 are combined at optical combiner 1494 and then transmitted by viewpoint 102 by switchable lens 1424. As light 1411 is LCP and light 1412 is RCP, switchable lens 1424 may be arranged to provide different focal lengths for each of the large and small FOV paths. As a specific example, switchable lens may provide a −58 mm focal length for light 1411 and a +58 mm focal length.

Figure 16:
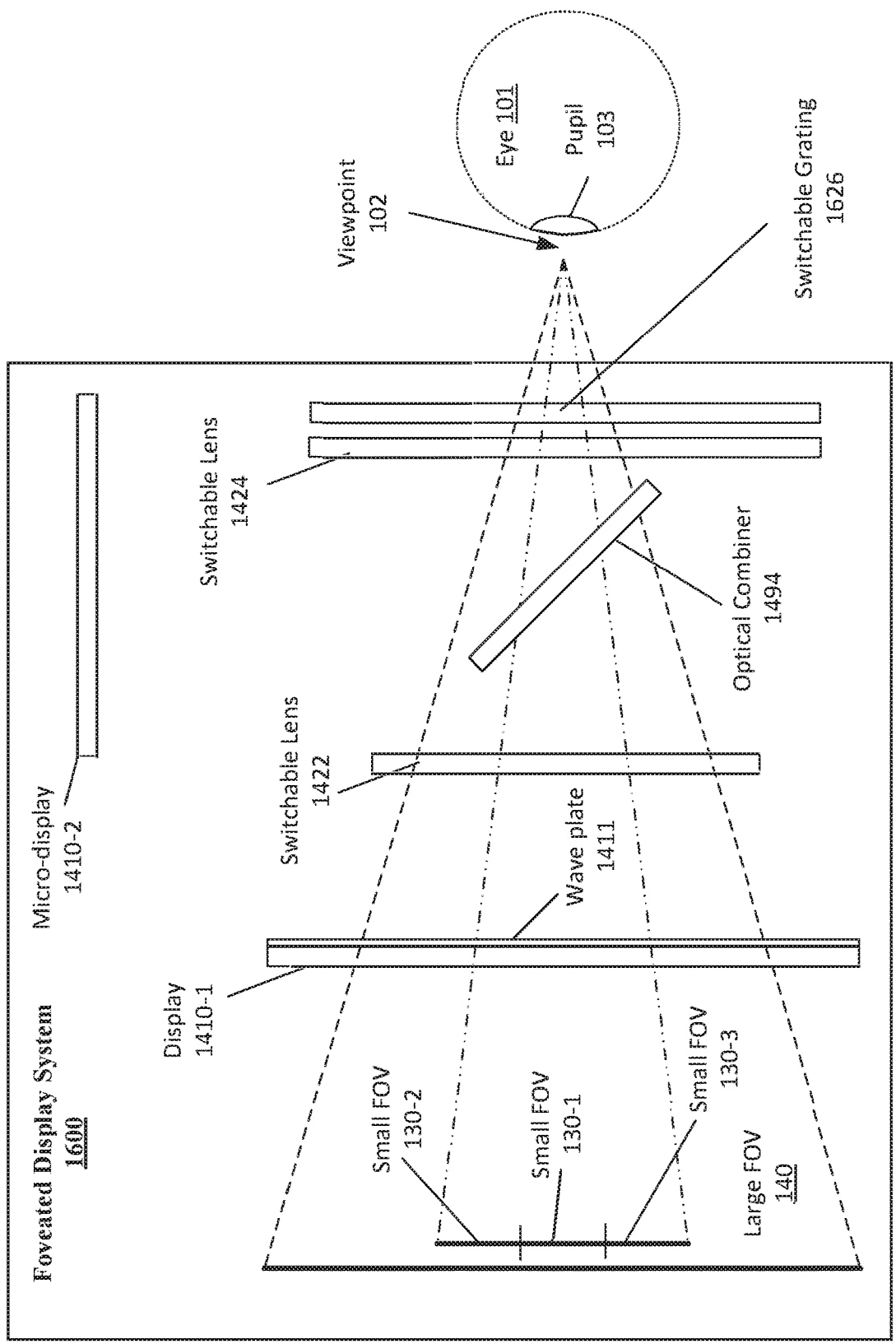
FIG. 16 illustrates a second foveated display system.

FIG. 16 illustrates a foveated display system 1600 comprising a first display 1410-1 and a second micro-display 1410-2. System 1600 is similar to system 1400, with the addition of a switchable grating 1626. In general, switchable grating 1626 can be switched to shift the perceived location of the image presented in the small FOV region 130. More specifically, switchable grating 1626 can be either off, positively activated, or negatively activated, to form small FOV regions 130-1, 130-2, and 130-3. Accordingly, in some examples, system 1600 can be implemented to shift a location of the small FOV 130 within the field of the large FOV 140 as described herein. Alternatively, or additionally, system 1600 can be implemented to multiplex multiple different high resolution FOV images (each perceived at a different small FOV location 130) to form a larger area for small FOV 130.

Figure 17A:
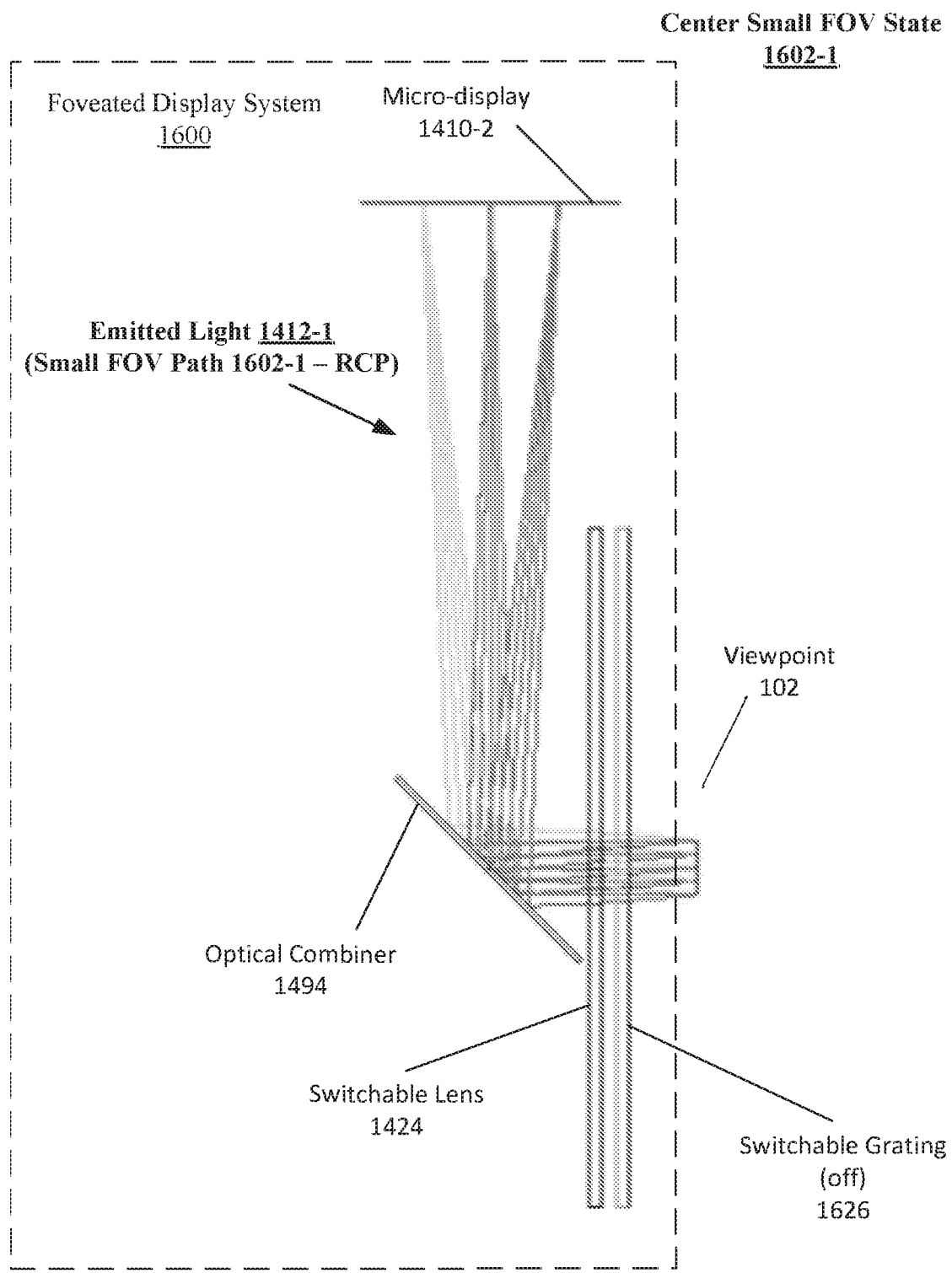
FIGS. 17A, 17B, and 17C illustrate the small field of view light path of the foveated display system of FIG. 16 for three time multiplexed states.
Figure 17B:
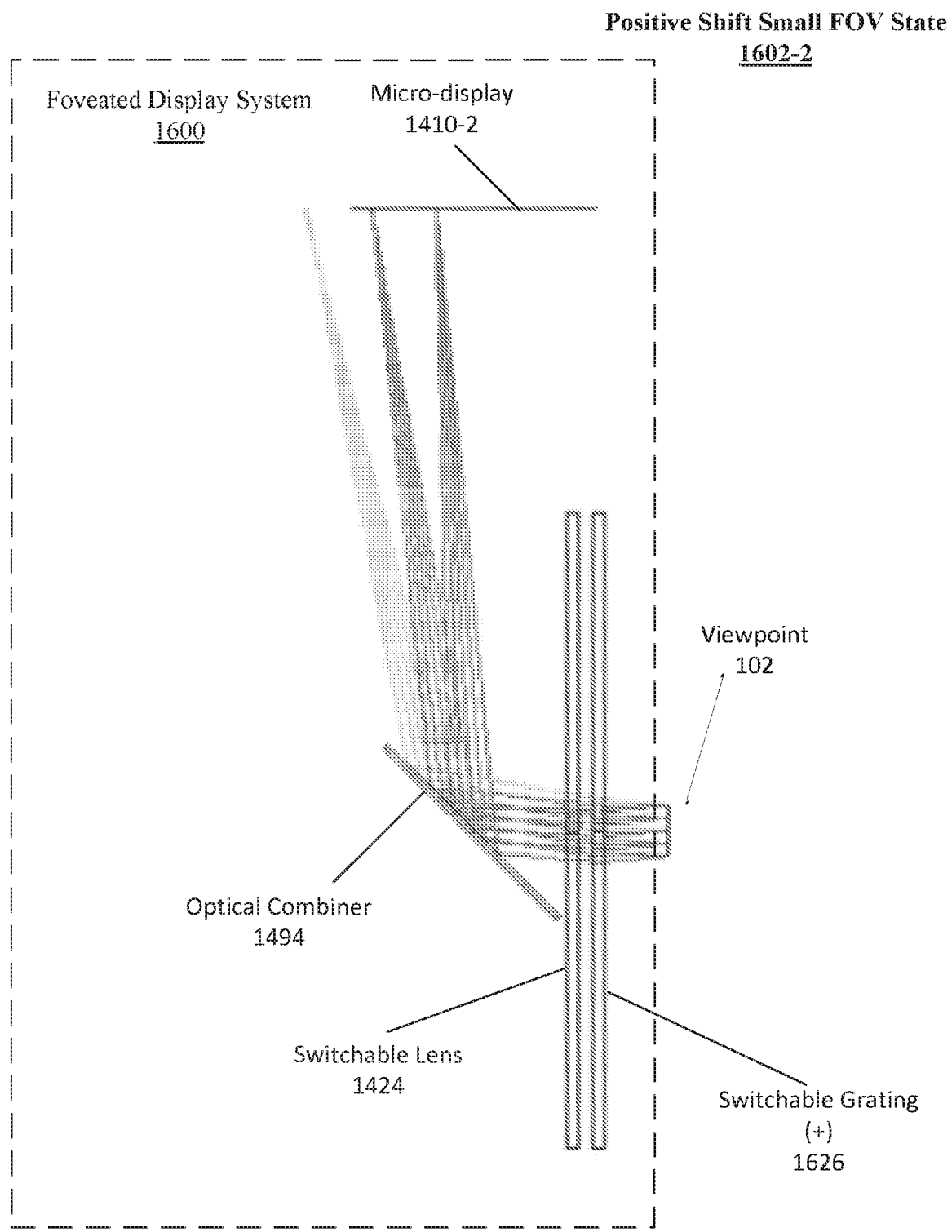
Figure 17C:
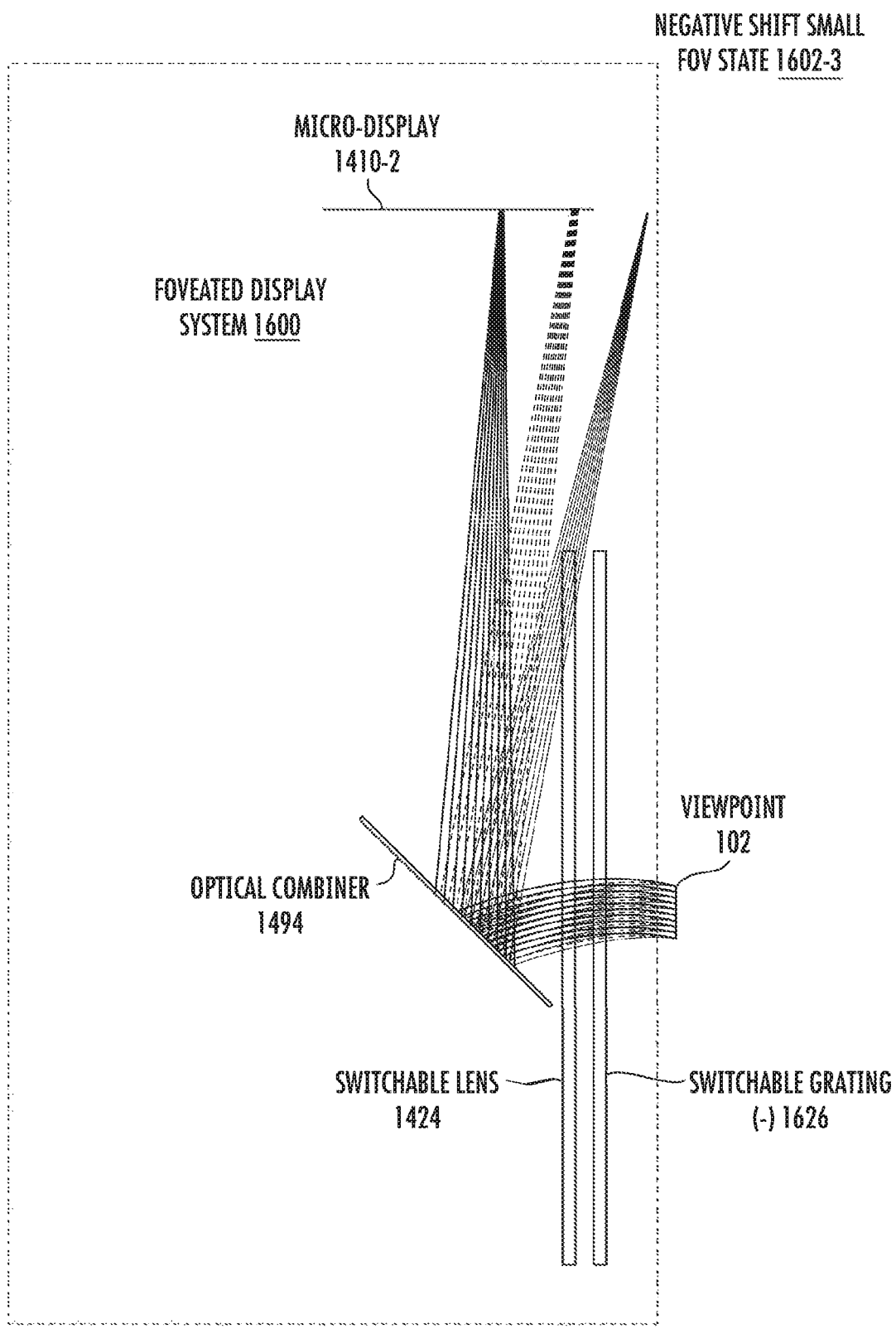

FIGS. 17A, 17B, and 17C illustrate light rays 1611 for display system 1600 corresponding to center and shifted small FOV states 1602. As illustrated, light 1412, which is RCP light in this example, is emitted by micro-display 1410-2. It is noted, that display 1410-1 and light 1411 associated with display 1410-1 are not shown. However, like in FIG. 15, light 1412 can be combined with light 1411 by optical combiner 1494 to form a composite image as described herein.

Referring to FIG. 17A, light 1412-1 corresponding to an image for a center region 130-1 of the small FOV 130 can be emitted. Likewise, switchable grating 1626 can be "off" such that the position of the image is rendered central to the small FOV 130 (e.g., at region 130-1, or the like. However, referring to FIGS. 17B and 17C, light 1412-2 and 1412-3 corresponding to images for the positively and negatively shifted regions 130-2 and 130-3, respectively, are shown. In these examples, switchable grating 1626 can be either positively activated or negatively activated to generate a positive or negative shift in the position of the small FOV 130 (e.g., region 130-2, 130-3, or the like) as perceived at viewpoint 102. Where images corresponding to light 1412-1, 1412-2, and 1412-3 are multiplexed in time, a number of small FOV images can be combined to present a larger region associated with the higher resolution virtual image as described herein.

Figure 18:
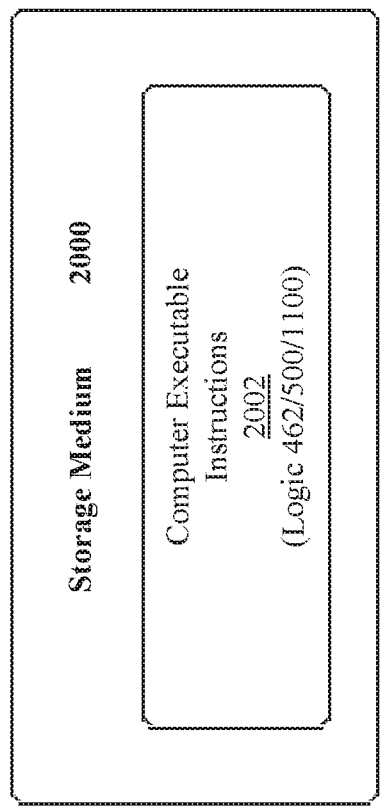
FIG. 18 illustrates a storage medium.

FIG. 18 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement instructions 461, logic flow 500, and/or logic flow 1100. For example, storage medium 2000 can be coupled to manufacturing equipment (e.g., pick and place equipment, lithographic equipment, or the like) and arranged to manufacture a display panel stack with individual digital polarizers as discussed herein.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 19:
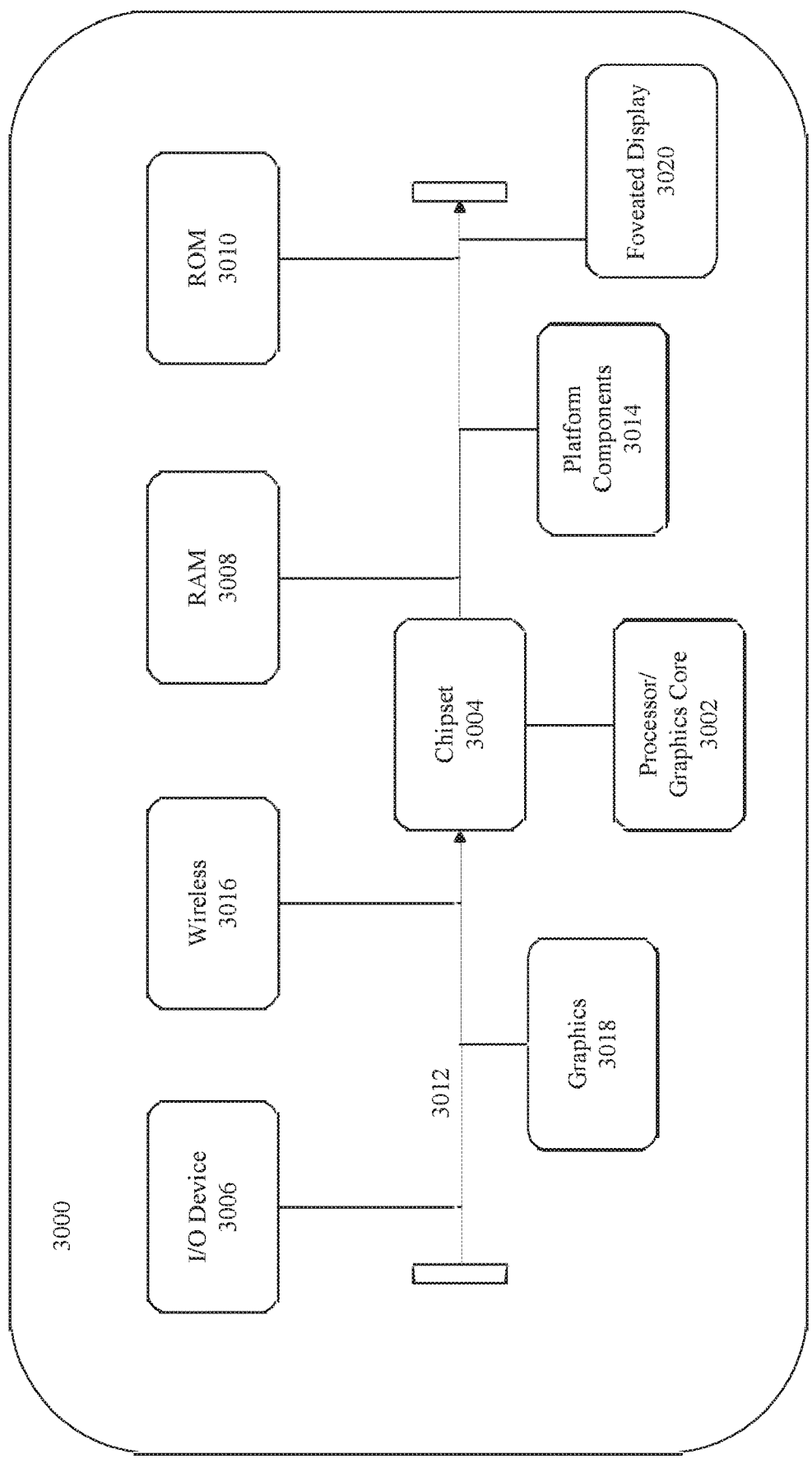
FIG. 19 illustrates a platform.

FIG. 19 is a diagram of an exemplary system embodiment and, depicts a platform 3000, which may include various elements. For instance, this figure depicts that platform (system) 3000 may include a processor/graphics core 3002, a chipset 3004, an input/output (I/O) device 3006, a random-access memory (RAM) (such as dynamic RAM (DRAM)) 3008, and a read only memory (ROM) 3010, foveated display 3020 (e.g., foveated display stack 100, foveated display stack 810, foveated display stack 1200, foveated display stack 1300, foveated display system 1400, foveated display system 1600, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

The following examples pertain to further embodiments, from which numerous permutations and configurations will be apparent.

Example 1

A system, comprising: a foveated display stack, the foveated display stack comprising: a display; a first switchable lens; and a second lens, the first switchable lens and the second lens disposed in an optical path of light emitted by the display; circuitry coupled to the display, the first switchable lens, and the second switchable lens; and memory coupled to the circuitry, the memory comprising instructions that when executed by the circuitry, cause the circuitry to: send a control signal to the display to cause the display to iterate between displaying a first image and a second image; and send a first activation signal to the first switchable lens to cause the first switchable lens to iterate between a first state to provide a first focal length in synchronization with the display displaying the first image and a second state to provide a second focal length in synchronization with the display displaying the second image, wherein the second lens provides a third focal length.

Example 2

The system of example 1, wherein the first focal length and the third focal length are arranged to provide the perception of a first field of view (FOV) for the first image and wherein the second focal length and the third focal length are arranged to provide the perception of a second FOV for the second image, wherein the first FOV is larger than the second FOV.

Example 3

The system of example 1, wherein the first switchable lens is disposed between the display and the second lens.

Example 4

The system of example 1, wherein the first switchable lens changes a polarization of transmitted light in the first state and does not change the polarization of transmitted light in the second state.

Example 5

The system of example 3, wherein the display is arranged to emit circularly polarized light.

Example 6

The system of example 1, comprising a camera coupled to the circuitry, the memory comprising instructions that when executed by the circuitry, cause the circuitry to: receive an image captured by the camera; determine a gaze of a user of the system based on the captured image; and generate the first image and the second image based in part on the gaze.

Example 7

The system of example 6, comprising a switchable grating coupled to the circuitry, the memory comprising instructions that when executed by the circuitry, cause the circuitry to send a second activation signal to the switchable grating to cause the switchable grating to provide a first angle of refraction in synchronization with the display displaying the first image and a second angle of refraction in synchronization with the display displaying the second image.

Example 8

The system of example 1, comprising: a third switchable lens; and a fourth switchable lens, the third switchable lens and the fourth switchable lens disposed in an optical path of light emitted by the display, the memory comprising instructions that when executed by the circuitry, cause the circuitry to: send the first activation signal to the first switchable lens and the fourth switchable lens to activate the first switchable lens and the fourth switchable lens in synchronization with the display displaying the first image to provide a first field of view (FOV) for the first image at a viewpoint; and send a second activation signal to the second switchable lens and the third switchable lens to activate the second switchable lens and the third switchable lens in synchronization with the display displaying the second image to provide a second FOV for the second image at the viewpoint.

Example 9

The system of example 1, comprising a fixed refractive lens disposed between the first switchable lens and the second switchable lens.

Example 10

A foveated display stack, comprising: a micro-display arranged to display images; a first switchable lens arranged to switch between providing a first and a second focal length; and a second switchable lens arranged to provide a third and a fourth focal length, the first switchable lens and the second switchable lens disposed in an optical path of light emitted by the micro-display, the first and the third focal length arranged to provide a first field of view (FOV) for images displayed by the micro-display and the second and either the third or the fourth focal length arrange to provide a second FOV for images displayed by the micro-display, wherein the second FOV is smaller than the first FOV.

Example 11

The foveated display stack of example 10, comprising: a switchable grating arranged to switch between providing a first angle of refraction and a second angle of refraction to change a location of the second FOV relative to the first FOV.

Example 12

The foveated display stack of example 10, wherein the first switchable lens and the second switchable lens comprise geometric phase lenses.

Example 13

The foveated display stack of example 10, comprising: a third switchable lens arranged to switch between providing a fifth and a sixth focal length; and a fourth switchable lens arranged to provide a seventh focal length and an eighth focal length, the third switchable lens and the fourth switchable lens disposed in an optical path of light emitted by the micro-display, the first, fourth, sixth, and seventh focal lengths arranged to provide the first FOV and the second, third, fifth, and eights focal lengths arrange to provide the second FOV.

Example 14

The foveated display stack of example 13, wherein the first, third, fifth, and seventh focal lengths are zero.

Example 15

The foveated display stack of example 10, wherein the first switchable lens and the second switchable lens comprise geometric phase lenses.

Example 16

The foveated display stack of example 10, comprising a fixed refractive lens disposed between the first switchable lens and the second switchable lens.

Example 17

A foveated display system, comprising: a first display; a second micro-display; an optical combiner; a first switchable lens, disposed in an optical path between the first display and the optical combiner; and a second switchable lens, disposed in an optical path between the optical combiner and a viewpoint, wherein the first and the second switchable lens are arranged to provide a focal length dependent upon a polarization of incident light, wherein: the first display, the first switchable lens, the optical combiner, and the second switchable lens are arranged to provide a large field of view (FOV) optical path at the viewpoint, the second micro-display, the optical combiner, and the second switchable lens are arranged to provide a small FOV optical path at the viewpoint.

Example 18

The foveated display system of example 17, wherein the first display is arranged to emit light having a first circular polarization and the second micro-display is arranged to emit light having a second circular polarization, different from the first circular polarization.

Example 19

The foveated display system of example 17, comprising: circuitry coupled to the first micro-display and the second micro-display; and memory coupled to the circuitry, the memory comprising instructions that when executed by the circuitry, cause the circuitry to: send a first control signal to the first display to cause the first micro-display to display a first image; send a second control signal to the second micro-display to cause the second micro-display to display a second image, the second image to have a larger field of view than the first image.

Example 20

The foveated display system of example 19, wherein the first image combines with the second image to provide a foveated image at the viewpoint.

Example 21

At least one machine-readable storage medium comprising instructions that when executed by a processor coupled to a foveated display stack cause the processor to: send a control signal to a micro-display of the foveated display stack to cause the micro-display to iterate between displaying a first image and a second image; and send a first activation signal to a first switchable lens of the foveated display stack to cause the first switchable lens to iterate between a first state to provide a first focal length in synchronization with the micro-display displaying the first image and a second state to provide a second focal length in synchronization with the micro-display displaying the second image, wherein the foveated displays stack comprises a second switchable lens to provide a third and a fourth focal length dependent upon a polarization of incident light, the first focal length and the second focal length to combine to provide a first field of view (FOV) for the first image and a second FOV, different than the first FPV, for the second image.

Example 22

The at least one machine-readable storage medium of example 21, comprising instructions that further cause the processor to send a second activation signal to a switchable grating of the foveated display stack to cause the switchable grating to provide a first angle of refraction in synchronization with the micro-display displaying the first image and a second angle of refraction in synchronization with the micro-display displaying the second image.

Example 23

The at least one machine-readable storage medium of example 21, the foveated display stack comprising a third switchable lens and a fourth switchable lens, and medium comprising instructions that further cause the processor to: send the first activation signal to the first switchable lens and the fourth switchable lens to activate the first switchable lens and the fourth switchable lens in synchronization with the micro-display displaying the first image to provide the first FOV; and send a second activation signal to the second switchable lens and the third switchable lens to activate the second switchable lens and the third switchable lens in synchronization with the micro-display displaying the second image to provide the second FOV.

Example 24

A method, comprising: sending a control signal to a micro-display of the foveated display stack to cause the micro-display to iterate between displaying a first image and a second image; and sending a first activation signal to a first switchable lens of the foveated display stack to cause the first switchable lens to iterate between a first state to provide a first focal length in synchronization with the micro-display displaying the first image and a second state to provide a second focal length in synchronization with the micro-display displaying the second image, wherein the foveated displays stack comprises a second switchable lens to provide a third and a fourth focal length dependent upon a polarization of incident light, the first focal length and the second focal length to combine to provide a first field of view (FOV) for the first image and a second FOV, different than the first FPV, for the second image.

Example 25

The method of example 24, comprising sending a second activation signal to a switchable grating of the foveated display stack to cause the switchable grating to provide a first angle of refraction in synchronization with the micro-display displaying the first image and a second angle of refraction in synchronization with the micro-display displaying the second image.

Example 26

The method of example 24, the foveated display stack comprising a third switchable lens and a fourth switchable lens, the method comprising: sending the first activation signal to the first switchable lens and the fourth switchable lens to activate the first switchable lens and the fourth switchable lens in synchronization with the micro-display displaying the first image to provide the first FOV; and sending a second activation signal to the second switchable lens and the third switchable lens to activate the second switchable lens and the third switchable lens in synchronization with the micro-display displaying the second image to provide the second FOV.

Example 27

An apparatus, comprising means arranged to implement the function of any one of examples 24 to 26.

Example 28

A foveated display stack, comprising: a display; a first switchable lens; and a second lens, the first switchable lens and the second lens disposed in an optical path of light emitted by the micro-display, the display arranged to iterate between displaying a first image and a second image responsive to a control signal comprising an indication of the first image and the second image; and the first switchable lens, responsive to a first activation signal, arranged to iterate between a first state to provide a first focal length in synchronization with the micro-display displaying the first image and a second state to provide a second focal length in synchronization with the micro-display displaying the second image, wherein the second lens provides a third focal length.

Example 29

The foveated display stack of example 28, wherein the first focal length and the third focal length are arranged to provide the perception of a first field of view (FOV) for the first image and wherein the second focal length and the third focal length are arranged to provide the perception of a second FOV for the second image, wherein the first FOV is larger than the second FOV.

Example 30

The foveated display stack of example 28, wherein the first switchable lens is disposed between the display and the second lens.

Example 31

The foveated display stack of example 28, wherein the first switchable lens changes a polarization of transmitted light in the first state and does not change the polarization of transmitted light in the second state.

Example 32

The foveated display stack of example 31, wherein the display is arranged to emit circularly polarized light.

Example 33

The foveated display stack of example 28, comprising a switchable grating coupled to the circuitry, the memory comprising instructions that when executed by the circuitry, cause the circuitry to send a second activation signal to the switchable grating to cause the switchable grating to provide a first angle of refraction in synchronization with the display displaying the first image and a second angle of refraction in synchronization with the display displaying the second image.

Example 34

The foveated display stack of example 28, comprising: a third switchable lens; and a fourth switchable lens, the third switchable lens and the fourth switchable lens disposed in an optical path of light emitted by the display, the memory comprising instructions that when executed by the circuitry, cause the circuitry to: send the first activation signal to the first switchable lens and the fourth switchable lens to activate the first switchable lens and the fourth switchable lens in synchronization with the display displaying the first image to provide a first field of view (FOV) for the first image at a viewpoint; and send a second activation signal to the second switchable lens and the third switchable lens to activate the second switchable lens and the third switchable lens in synchronization with the display displaying the second image to provide a second FOV for the second image at the viewpoint.

Example 35

The foveated display stack of example 28, comprising a fixed refractive lens disposed between the first switchable lens and the second switchable lens.

Example 36

The foveated display stack of any one of examples 28 to 35, wherein the display is a micro-display.

Example 37

The system of any one of examples 1 to 10, wherein the display is a micro-display.

What is claimed is:

1. A system, comprising:
 a foveated display stack, the foveated display stack comprising:
  a display,
  a first switchable lens,
  a second lens, the first switchable lens and the second lens disposed in an optical path of light emitted by the display, and
  a switchable grating,
 circuitry coupled to the display, the first switchable lens, and the switchable grating; and
 memory coupled to the circuitry, the memory comprising instructions that when executed by the circuitry, cause the circuitry to:
  send a control signal to the display to cause the display to iterate between displaying a first image and a second image,
  send a first activation signal to the first switchable lens to cause the first switchable lens to iterate between a first state to provide a first focal length in synchronization with the display displaying the first image and a second state to provide a second focal length in synchronization with the display displaying the second image, wherein the second lens provides a third focal length, and
  send a second activation signal to the switchable grating to cause the switchable grating to provide a first angle of refraction in synchronization with the display displaying the first image and a second angle of refraction in synchronization with the display displaying the second image.

2. The system of claim 1, wherein the first focal length and the third focal length are arranged to provide the perception of a first field of view (FOV) for the first image and wherein the second focal length and the third focal length are arranged to provide the perception of a second FOV for the second image, wherein the first FOV is larger than the second FOV.

3. The system of claim 1, wherein the first switchable lens is disposed between the display and the second lens.

4. The system of claim 3, wherein the display is arranged to emit circularly polarized light.

5. The system of claim 1, wherein the first switchable lens changes a polarization of transmitted light in the first state and does not change the polarization of transmitted light in the second state.

6. The system of claim 1, comprising a camera coupled to the circuitry, the memory comprising instructions that when executed by the circuitry, cause the circuitry to:
 receive an image captured by the camera;
 determine a gaze of a user of the system based on the captured image; and
 generate the first image and the second image based in part on the gaze.

7. The system of claim 1, wherein the second lens is a second switchable lens, the system comprising:
 a third switchable lens; and
 a fourth switchable lens, the third switchable lens and the fourth switchable lens disposed in an optical path of light emitted by the display, the memory comprising instructions that when executed by the circuitry, cause the circuitry to:
  send the first activation signal to the first switchable lens and the fourth switchable lens to activate the first switchable lens and the fourth switchable lens in synchronization with the display displaying the first image to provide a first field of view (FOV) for the first image at a viewpoint; and
  send a second activation signal to the second switchable lens and the third switchable lens to activate the second switchable lens and the third switchable lens in synchronization with the display displaying the second image to provide a second FOV for the second image at the viewpoint.

8. The system of claim 1, comprising a fixed refractive lens disposed between the first switchable lens and the second lens.

9. A foveated display stack, comprising:
 a micro-display arranged to display images;
 a first switchable lens arranged to switch between providing a first and a second focal length; and
 a second switchable lens arranged to provide a third and a fourth focal length, the first switchable lens and the second switchable lens disposed in an optical path of light emitted by the micro-display, the first and the third focal length arranged to provide a first field of view (FOV) for images displayed by the micro-display and the second and either the third or the fourth focal length arrange to provide a second FOV for images displayed by the micro-display, wherein the second FOV is smaller than the first FOV.

10. The foveated display stack of claim 9, comprising a switchable grating arranged to switch between providing a first angle of refraction and a second angle of refraction to change a location of the second FOV relative to the first FOV.

11. The foveated display stack of claim 9, wherein the first switchable lens and the second switchable lens comprise geometric phase lenses.

12. The foveated display stack of claim 9, comprising:
 a third switchable lens arranged to switch between providing a fifth and a sixth focal length; and
 a fourth switchable lens arranged to provide a seventh focal length and an eighth focal length, the third switchable lens and the fourth switchable lens disposed in an optical path of light emitted by the micro-display, the first, fourth, sixth, and seventh focal lengths arranged to provide the first FOV and the second, third, fifth, and eights focal lengths arrange to provide the second FOV.

13. The foveated display stack of claim 12, wherein the first, third, fifth, and seventh focal lengths are zero.

14. The foveated display stack of claim 9, wherein the first switchable lens and the second switchable lens comprise geometric phase lenses.

15. The foveated display stack of claim 9, comprising a fixed refractive lens disposed between the first switchable lens and the second switchable lens.

16. A foveated display system, comprising:
 a first display;
 a second micro-display;
 an optical combiner;
 a first switchable lens, disposed in an optical path between the first display and the optical combiner; and
 a second switchable lens, disposed in an optical path between the optical combiner and a viewpoint, wherein the first and the second switchable lens are arranged to provide a focal length dependent upon a polarization of incident light, wherein:
  the first display, the first switchable lens, the optical combiner, and the second switchable lens are arranged to provide a large field of view (FOV) optical path at the viewpoint, and the second micro-display, the optical combiner, and the second switchable lens are arranged to provide a small FOV optical path at the viewpoint.

17. The foveated display system of claim 16, wherein the first display is arranged to emit light having a first circular polarization and the second micro-display is arranged to emit light having a second circular polarization, different from the first circular polarization.

18. The foveated display system of claim 16, comprising:
circuitry coupled to the first micro-display and the second micro-display; and
memory coupled to the circuitry, the memory comprising instructions that when executed by the circuitry, cause the circuitry to:
send a first control signal to the first display to cause the first micro-display to display a first image; and
send a second control signal to the second micro-display to cause the second micro-display to display a second image, the second image to have a larger field of view than the first image.

19. The foveated display system of claim 18, wherein the first image combines with the second image to provide a foveated image at the viewpoint.

20. At least one non-transitory machine-readable storage medium comprising instructions that when executed by a processor coupled to a foveated display stack cause the processor to:
send a control signal to a micro-display of the foveated display stack to cause the micro-display to iterate between displaying a first image and a second image; and
send a first activation signal to a first switchable lens of the foveated display stack to cause the first switchable lens to iterate between a first state to provide a first focal length in synchronization with the micro-display displaying the first image and a second state to provide a second focal length in synchronization with the micro-display displaying the second image, wherein the foveated displays stack comprises a second switchable lens to provide a third and a fourth focal length dependent upon a polarization of incident light, the first focal length and the second focal length to combine to provide a first field of view (FOV) for the first image and a second FOV, different than the first FOV, for the second image.

21. The at least one non-transitory machine-readable storage medium of claim 20, comprising instructions that further cause the processor to send a second activation signal to a switchable grating of the foveated display stack to cause the switchable grating to provide a first angle of refraction in synchronization with the micro-display displaying the first image and a second angle of refraction in synchronization with the micro-display displaying the second image.

22. The at least one non-transitory machine-readable storage medium of claim 20, the foveated display stack comprising a third switchable lens and a fourth switchable lens, and medium comprising instructions that further cause the processor to:
send the first activation signal to the first switchable lens and the fourth switchable lens to activate the first switchable lens and the fourth switchable lens in synchronization with the micro-display displaying the first image to provide the first FOV; and
send a second activation signal to the second switchable lens and the third switchable lens to activate the second switchable lens and the third switchable lens in synchronization with the micro-display displaying the second image to provide the second FOV.

\* \* \* \* \*